US011706123B2

(12) United States Patent
Mehmedagic

(10) Patent No.: US 11,706,123 B2
(45) Date of Patent: Jul. 18, 2023

(54) TIME-SENSITIVE SOFTWARE DEFINED NETWORKING

(71) Applicant: Schneider Electric Industries SAS, Rueil Malmaison (FR)

(72) Inventor: Alen Mehmedagic, Wilmington, MA (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 57 days.

(21) Appl. No.: 17/020,538

(22) Filed: Sep. 14, 2020

(65) Prior Publication Data

US 2020/0412638 A1 Dec. 31, 2020

Related U.S. Application Data

(63) Continuation of application No. 16/318,683, filed as application No. PCT/EP2017/068213 on Jul. 19, 2017, now Pat. No. 10,805,205.

(60) Provisional application No. 62/364,313, filed on Jul. 19, 2016.

(51) Int. Cl.
| | |
|---|---|
| *H04L 45/121* | (2022.01) |
| *H04L 45/302* | (2022.01) |
| *H04L 45/64* | (2022.01) |
| *H04L 45/12* | (2022.01) |
| *H04L 45/42* | (2022.01) |

(52) U.S. Cl.
CPC .......... *H04L 45/121* (2013.01); *H04L 45/123* (2013.01); *H04L 45/3065* (2013.01); *H04L 45/42* (2013.01); *H04L 45/64* (2013.01)

(58) Field of Classification Search
CPC . H04L 45/121; H04L 45/123; H04L 45/3065; H04L 45/42; H04L 45/64
USPC ........................................ 370/229, 235, 238
See application file for complete search history.

(56) References Cited

U.S. PATENT DOCUMENTS

| | | |
|---|---|---|
| 2014/0369348 A1 | 12/2014 | Zhang et al. |
| 2015/0188837 A1 | 7/2015 | Djukic et al. |

(Continued)

OTHER PUBLICATIONS

Slavica Tomovic et al., "Fast and efficient bandwidth-delay constrained routing algorithm for SDN networks," 2016 IEEE Netsoft Conference and Workshops (Netsoft), IEEE, Jun. 6, 2016, pp. 303-311.

(Continued)

*Primary Examiner* — Obaidul Huq
(74) *Attorney, Agent, or Firm* — Locke Lord LLP

(57) ABSTRACT

A system and method for determining a network path through a network that is managed by a software defined network (TsSDN) controller incorporating time management are disclosed. In some embodiments, the SDN controller can determine that a data packet originating from a transmitting device and directed to a receiving device is associated with one of: time-sensitive, timeaware or best effort characteristic. The controller can then determine a network path for transport of the data packet from the transmitting device to the receiving device with a guaranteed end to end delay to satisfy the characteristic. The end to end delay considers latency through each layer the data packet transitions through after being conjured at an application layer of the transmitting device. The data packet is then transmitted from the transmitting device via the network path to the receiving device.

25 Claims, 19 Drawing Sheets

(56) References Cited

U.S. PATENT DOCUMENTS

| | | | |
|---|---|---|---|
| 2015/0208316 A1* | 7/2015 | Mosko | H04W 40/24 370/238 |
| 2015/0319078 A1* | 11/2015 | Lee | H04L 45/12 370/392 |
| 2015/0372929 A1 | 12/2015 | Rochwerger et al. | |
| 2016/0065422 A1 | 3/2016 | Khargharia et al. | |
| 2016/0226758 A1 | 8/2016 | Ashwood-Smith | |
| 2017/0034063 A1* | 2/2017 | Mozolewski | H04L 47/28 |
| 2017/0237649 A1* | 8/2017 | Sampath | H04L 43/0888 370/238 |
| 2018/0006955 A1 | 1/2018 | Bush et al. | |

OTHER PUBLICATIONS

Daniel Thiele et al., "Formal analysis based evaluation of software defined networking for time-sensitive Ethernet," Design, Automation & Test in Europe, EDA Consortium, 111 West Saint John Street, Suite 220, San Jose, CA 95113, USA, Mar. 14, 2016, pp. 31-36.

Chen Huawei Technologies et al., "Framework for temporal tunnel services; draft-chen-teas-frmwk-tts-01.txt," Internet Engineering Task Force, IETF; Standardworkingdraft, Internet Society (ISOC) 4, Rue Des Falaises CH-1205, Geneva, Switzerland, Mar. 21, 2016, pp. 1-25.

Naresh Ganesh Nayak et al., "Time-sensitive Software-defined Network (TSSDN) for Real-time Applications," Real-Time Networks and Systems, ACM, 2 Penn Plaza, Suite 701, New York, NY 10121, Oct. 19, 2016, pp. 193-202.

International Search Report and Written Opinion of the International Searching Authority dated Oct. 19, 2017 corresponding to PCT/EP2017/068213 (16 pages).

* cited by examiner

TIME-SENSITIVE SOFTWARE DEFINED NETWORKING

CROSS-REFERENCE TO RELATED APPLICATION(S)

This application claims priority to and benefit of U.S. Non-Provisional application Ser. No. 16/318,683, filed on Jan. 17, 2019, entitled, TIME-SENSITIVE SOFTWARE DEFINED NETWORKING, which is a § 371 of International Application Serial No. PCT/EP2017/068213, filed on Jul. 19, 2017, which claims priority and benefit of U.S. Provisional Application Ser. No. 62/364,313 entitled "Time Sensitive Software Defined Network" filed on Jul. 19, 2016, the entire contents of which are incorporated herein by reference.

BACKGROUND

Communication networks (or simply networks) enable data communication, for example, between computers, computers and peripherals and other devices. Different domains have different requirements for data communication. For example, in the industrial domain, physical processes have strict timing requirements that need to be controlled and monitored for safety and other reasons. Take an example of a highspeed cheese slicing system where a highspeed knife blade slices through a block of cheese that is pushed forward by a cheese block feeder driven by motors. By how much the cheese block feeder needs advance is determined by a scanning system analyzing the holes in the cheese block. In order for the cheese slicing system to produce cheese slices of approximately the same weight, the motion of the knife blade must be synchronized with the movement of the cheese block. Even a small delay in this system (either in processing or network) can mean cheese slices of non-uniform weights, resulting in wastage and loss of productivity. Similarly, in automotive domain, safety critical applications which enable safety features (e.g., auto braking) and enable autonomous driving also have strict timing requirements for communication. Any unaccounted-for delay in the system can have serious safety implications.

In both industrial and automotive domains, there is greater desire to use Ethernet technology for the network backbone to support Internet of Things (IoT)/Industrial Internet of Things (IIoT) connectivity to benefit from remote monitoring and management, centralized analytics, and the like. Ethernet standard, however, cannot guarantee that critical data will be delivered across a network from device A to device B in time—a key requirement for both industrial and automotive applications. Time-sensitive networking (TSN) which offers a fully deterministic real time delivery of Ethernet traffic is a solution that can meet the requirements of the industrial and automotive applications.

SUMMARY OF THE EMBODIMENTS

In an exemplary embodiment, a system for determining a network path through a network comprises a software-defined networking (SDN) controller incorporating time domain with the SDN controller executing on one or more distributed hardware. and a network including a plurality of time-sensitive and non-time-sensitive network devices for forwarding data packets. The SDN controller is configured to manage the network by determining that a data packet is associated with one of: time-sensitive, time-aware or best effort time-sensitivity characteristic, the data packet originating from a transmitting device and to be delivered to a receiving device, determining a network path for transport of the data packet from the transmitting device to the receiving device with a guaranteed end to end delay to satisfy the time-sensitivity characteristic, and transmitting the data packet from the transmitting device via the network path to the receiving device. The end to end delay for the data packet can take into account latency through each layer the data packet transitions through after it is conjured at an application layer of the transmitting device.

In another exemplary embodiment, a method for transmitting a time-sensitive data packet through a network infrastructure comprising time-sensitive and non-time-sensitive network devices, comprises receiving by a time-sensitive software defined network (TsSDN) controller a timing requirement for delivering a time-sensitive data packet originating from a first entity to a second entity across a network infrastructure comprising time-sensitive and non-time-sensitive network devices. The method further comprises determining a first network path through the network infrastructure using one or more of only the time-sensitive network devices, the first network path having a predictable latency that causes end to end delay for the time-sensitive data packet to be less than the timing requirement associated with the time-sensitive data packet, and transmitting the time-sensitive data packet from the first entity through the first network path to the second entity. The time-sensitive data packet can transition through an application layer, an operating system stack, a control plane and a data plane at each of the first and second entities. The end to end delay for a data packet can take into account latency through each layer the data packet transitions through after it is conjured at an application layer of the first entity.

In some instances, the TsSDN controller may receive a data packet originating from the first entity and determine based on stream reservation protocol activity detected from the first entity that the data packet is a time-sensitive data packet that includes time-sensitive data. The data packet may be reported to the TsSDN controller by a network device in the network infrastructure in response to determining that the data packet is a new type of data packet to be received at the network device.

In some instances, the first and second entities include a physical device, a virtual device hosted on a machine, or a service hosted on one or more distributed machines.

In some instances, the TsSDN controller may receive the timing requirement via a network application that is interfacing with the TsSDN controller via an application programming interface.

In some instances, the time-sensitive data packet is part of a flow, and all time-sensitive data packets associated with the flow are transmitted through the same first network path.

In some instances, the TsSDN controller may determine that a data packet originating from the first device is a time-sensitive data packet based on content of the packet.

In some instances, the TsSDN controller may be a software defined network (SDN) controller having a time management module capable of differentiating data packets that are time-sensitive, time-aware or best effort.

In some instances, the TsSDN controller may be a software defined network (SDN) controller having a time-sensitive network (TSN) application capable of configuring the time-sensitive network devices to preserve TSN established time domain.

In some instances, the TsSDN controller may be a software defined network (SDN) controller having a time-sensitive multi-path routing module implementing a link state protocol that uses an equal cost multi-tree (ECMT) algorithm to calculate the most efficient paths based on time-sensitivity and network load.

In some instances, the TsSDN controller may receive a data packet to be delivered from the first entity to a third entity across the network infrastructure. The controller may determine based on network configuration information associated with the data packet that the data packet is a time-aware data packet that includes time-aware data. The controller may further determine a second network path through the network infrastructure using one or more of the time-sensitive network devices and the non-time-sensitive network devices, the network path having a predictable latency that causes end to end delay for the time-aware data packet to be less than a timing requirement associated with the time-aware data packet and transmit the time-aware data packet from the first entity through the second network path to the third entity.

In some instances, the network configuration information includes at least one of: quality of service (QoS) or virtual local area network (VLAN) group ID.

In some instances, the TsSDN controller may receive a data packet to be delivered from the first entity to a fourth entity across the network infrastructure, determine based lack of stream reservation protocol activity and quality of service that the data packet is a best-effort data packet that has no time-sensitivity or time-awareness, determine a third network path through the network infrastructure using one or more of only the non-time-sensitive network devices to deliver the best-effort data packet and transmit the best-effort data packet from the first entity through the third network path to the fourth entity.

In some instances, each of the first and second entities may be an entity in an industrial automation system.

In some instances, each of the first and second entities may be an entity in a vehicular automation system.

In another exemplary embodiment, a non-transitory computer readable medium having stored thereon sequences of instruction which when executed by one or more machines causes the machines to receive a timing requirement for delivering a time-sensitive data packet originating from a first entity to a second entity across a network infrastructure comprising time-sensitive and non-time-sensitive network devices, determine a first network path through the network infrastructure using one or more of only the time-sensitive network devices, the first network path having a predictable latency that causes end to end delay for the time-sensitive data packet to be less than the timing requirement associated with the time-sensitive data packet, and transmit the time-sensitive data packet from the first entity through the first network path to the second entity. The time-sensitive data packet can transition through an application layer, an operating system stack, a control plane and a data plane at each of the first and second entities. The end to end delay for a data packet can take into account latency through each layer the data packet transitions through after it is conjured at an application layer of the first entity.

In another exemplary embodiment, a method for transmitting data packets through a network infrastructure comprising time-sensitive and non-time-sensitive network devices may comprise receiving by a time-sensitive software defined network (TsSDN) controller a timing requirement for a communication from a talker device to a listener device and network load information from a plurality of network devices. The controller may determine, based on the timing requirement and the network load information, a network path through the network infrastructure, wherein the network path has a predictable latency that causes end to end delay for the communication to meet the timing requirement. The controller may program one or more of the plurality of network devices in the network path to reserve bandwidth to guarantee the timing requirement for the communication from the talker device to the listener device and transmit data packets from the talker device to the listener device through the network path.

In some instances, the timing requirement may be specified in a request from the talker device to the TsSDN controller.

In some instances, the controller may receive from each of the talker device and the listener device a device delay.

In some instances, the end to end delay may be calculated based on the device delays received from the talker and listener devices and network device delays associated with the one or more of the plurality of network devices in the network path.

In some instances, the device delay may be the sum of delays that a data packet experiences as it transitions through an application layer, an operating system stack, a control plane and a device plane of the talker or listener device.

In some instances, the talker device and the listener device may include a physical device or a virtual device hosted on a machine.

In some instances, the TsSDN controller may be a software defined network (SDN) controller having a time management module.

In some instances, each of the talker and listener devices may be an industrial automation system device.

In some instances, each of the talker and listener devices may be a vehicular automation system device.

In another exemplary embodiment, a non-transitory computer readable medium having stored thereon instructions which when executed by one or more machines causes the machines to receive a timing requirement for a communication from a talker device to a listener device and network load information from a plurality of network devices, determine, based on the timing requirement and the network load information, a network path through the network infrastructure, wherein the network path has a predictable latency that causes end to end delay for the communication to meet the timing requirement, program one or more of the plurality of network devices in the network path to reserve bandwidth to guarantee the timing requirement for the communication from the talker device to the listener device and transmit data packets from the talker device to the listener device through the network path.

In yet another exemplary embodiment, a method of determining the shortest path from a talker device to a listener device in a time-sensitive software defined network, may comprise using Dijkstra algorithm to calculate costs of all possible paths from a talker device to a listener device in a time-sensitive software defined network to determine a network path having the smallest cost, detecting an increase in load on a link along the network path from the talker device to the listener device, responsive to detecting the increase in load, dynamically updating the cost of the link to include a load-based cost, and recalculating the costs of all possible paths from the talker device to the listener device using the Dijkstra algorithm to determine the shortest path for transport of data packets from the talker device to the listener device, wherein the shortest path corresponds to a network path having the smallest cost.

In some instances, all possible paths from the talker device to the listener device may include paths through only time-sensitive network devices, wherein the time-sensitive software defined network comprises time-sensitive and non-time-sensitive network devices.

In some instances, time-sensitive streams across the time-sensitive network devices may be monitored to detect addition of a new stream to a time-sensitive network device, in response, cost of links to the time-sensitive network device may be adjusted, and recalculation may be performed to determine the shortest path from the talker device to the listener device.

In some other instances, time-sensitive streams across the time-sensitive network devices may be monitored to detect when a time-sensitive network device exceeds a threshold number of streams passing through it, in response, cost of links to the time-sensitive network device may be adjusted, and recalculation may be performed to determine the shortest path.

In some instances, all possible paths from the talker device to the listener device may include paths through only non-time-sensitive network devices, wherein the time-sensitive software defined network comprises time-sensitive and non-time-sensitive network devices.

In some instances, the Dijkstra algorithm may be implemented on a logically centralized time-sensitive software defined network controller.

In some instances, the increase in load on the link may be detected based on information received by the TsSDN controller (e.g., from a diagnostic service associated with OpenFlow or a statistic monitoring module).

In another exemplary embodiment, a non-transitory computer readable medium having stored thereon instructions which when executed by one or more machines causes the machines to determine the shortest path from a talker device to a listener device in a time-sensitive software defined network, may comprise using Dijkstra algorithm to calculate costs of all possible paths from a talker device to a listener device in a time-sensitive software defined network to determine a network path having the smallest cost, detect an increase in load on a link along the network path from the talker device to the listener device, responsive to detecting the increase in load, dynamically update the cost of the link to include a load-based cost, and recalculate the costs of all possible paths from the talker device to the listener device using the Dijkstra algorithm to determine the shortest path for transport of data packets from the talker device to the listener device, wherein the shortest path corresponds to a network path having the smallest cost.

DETAILED DESCRIPTION

Figure 1A:
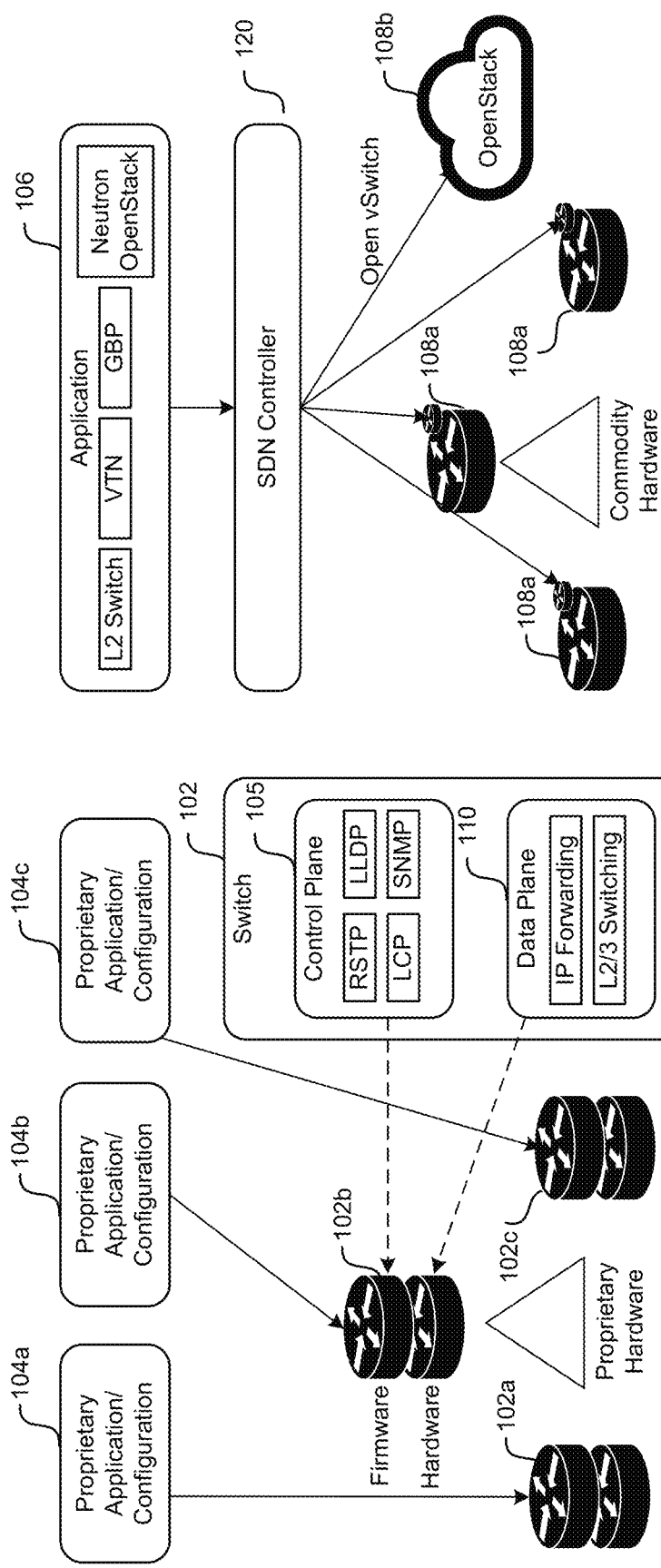
FIG. 1A is a block diagram illustrating traditional networking compared to software defined networking ("SDN").

The present disclosure describes a system and method for processing messages with time-sensitive, time-aware and best-effort characteristic in a software-defined network (SDN) incorporating time management or time domain. Such time-sensitive SDN (TsSDN) can comprise time-sensitive as well as non-time-sensitive network devices. A TsSDN controller, in some embodiments, can manage the network by determining whether a data packet originating from a transmitting device and to be delivered to a receiving device is associated with one of: time-sensitive, time-aware or best effort characteristic. The TsSDN controller can then determine a network path for transport of the data packet from the transmitting device to the receiving device with a guaranteed end to end delay to satisfy the characteristic. The data packet can then be transmitted from the transmitting device via the network path to the receiving device. In some embodiments, the end to end delay for the data packet takes into account latency through each layer the data packet transitions through after it is conjured at an application layer of the transmitting device. Specifically, end to end delay can be determined based device delays encountered at application and stack layers in the transmitting and receiving devices as well as delays in control plane where the TsSDN controller resides and data planes where the network devices that forward data packets reside.

These and other embodiments and aspects of the TsSDN network as well as its advantages will now be described in detail.

1. SOFTWARE-DEFINED NETWORK (SDN)

Industrial control system network architectures are complex and hierarchical in nature. A typical industrial control system uses a hierarchy of networking levels to separate concerns into a tiered architecture. For example, an ICS network architecture can include a device network, a control network, an enterprise network and an office network. At the lowest level, the architecture is segmented into functional units where each industrial device such as a PLC has a well-defined sphere of influence. This is complex and hard to manage as connectivity between devices and across levels is strictly controlled. This solution requires multiple subnets implemented through separate physical networks or virtual local area networks (VLANs) and gateways which require difficult manual configuration. Implementing and maintaining these networks requires a high degree of networking skill that is often not available at installations.

There are two realms of concern when considering Ethernet switching technology—the control plane and the data plane. The data plane is the traffic flowing through the switch. The control plane is concerned with the management and configuration of the switch to control how the data traffic is directed, shaped, or segmented into various portions of the network. In the traditional switching technologies (described in reference to FIGS. 1A and 1B) that are common in industrial automation, each switch manages its own control plane. Therefore, each switch is configured individually and acts somewhat autonomously from its neighboring switches. This is difficult to manage and system wide parameters such as VLANs and quality of service (QoS) must be carefully applied to each switch individually.

SDN presents an alternative to this architecture. SDN is a network architecture in which the system that makes decisions about where traffic is sent (i.e., the control plane) is decoupled from the underlying systems that forward traffic to the selected destination (i.e., the data plane). In simple terms, SDN makes network programmable. With SDN, network administrators can manage network services through abstraction of higher-level functionality.

SDN architecture is a layered architecture based on three basic principles:
(1) Decoupling of control and data planes: This principle allows for separate evolution of forwarding mechanism from network resource control. In other words, network control operates on abstracted forwarding mechanisms allowing for network elements to become a commodity.
(2) Logically centralized control: In SDN view, a controller is an orchestrator of network elements. Logically centralized control refers to a view of the network infrastructure as a holistic entity, giving SDN controller global control over all network resources i.e., controller behaves as a central management and control entity.
(3) Exposure of abstract network resources and state to external applications: Network as virtual function is the main driver behind this principle. Separation of control and data planes allows for SDN controller to provide network abstraction to other controllers or applications, which is recursive abstraction of networks and its elements.

Figure 1B:
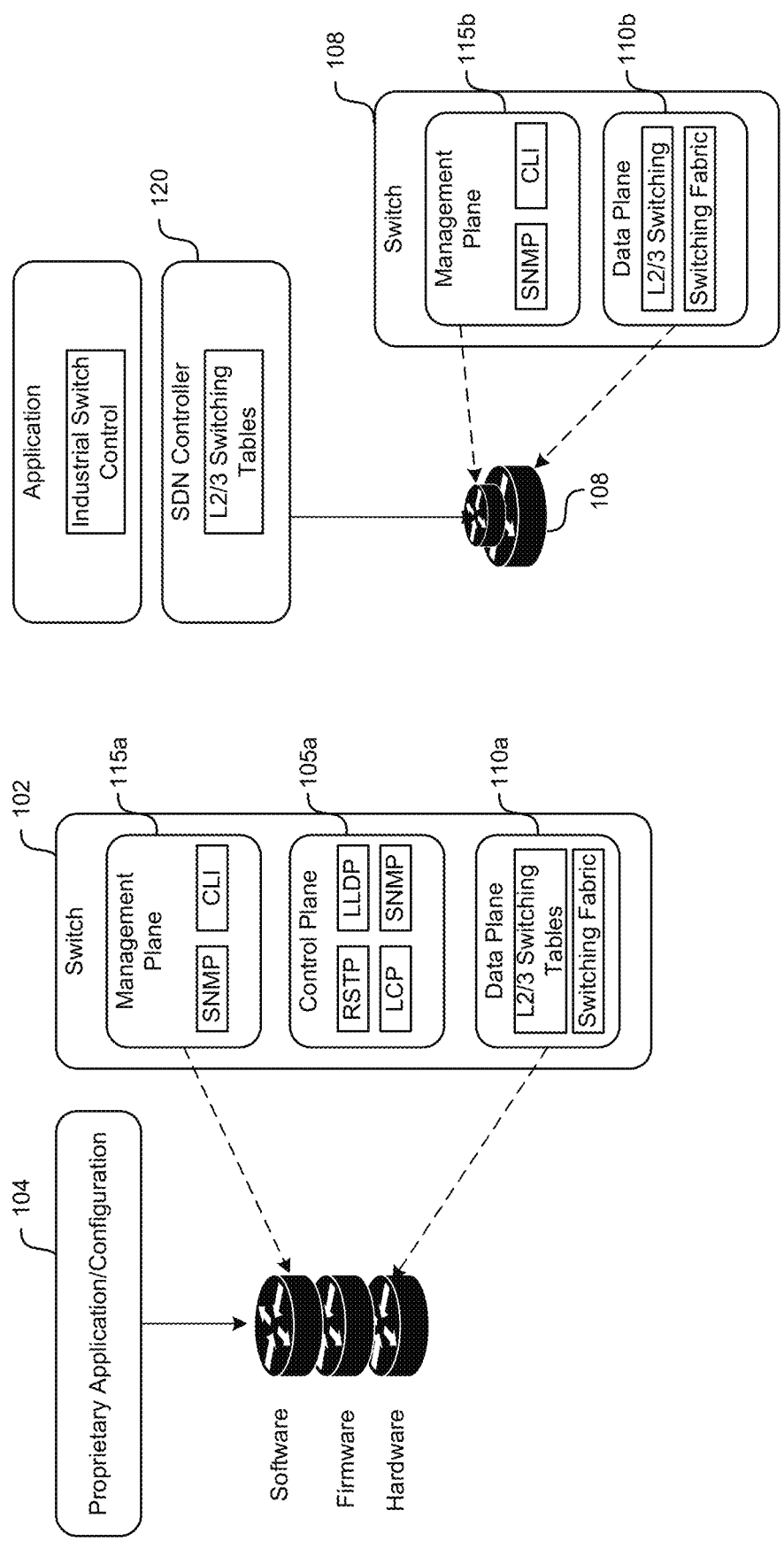
FIG. 1B is a block diagram illustrating a traditional network device implementation compared to a SDN device implementation.

FIG. 1A is a block diagram illustrating traditional networking compared to SDN. FIG. 1B is a block diagram illustrating a traditional network device implementation compared to a SDN device implementation.

Traditional networking architecture comprises of dedicated networking devices 102 such as, but not limited to: routers, switches, firewalls, and the like, provided by various vendors, with both the control plane 105 and the data plane 110 on the same device. Moreover, the multi-vendor networking infrastructure warrants that each device is managed individually using vendor proprietary interface, thus making provisioning, maintenance and de-commissioning extremely time consuming and costly. Use of specialized hardware, and at times, customized protocols, warrants that networking features implementation and availability is dictated by vendors. It also follows vendor's business model and product life cycle rather than network deployment needs. For example, in FIG. 1A, switches 102a, 102b and 102c can each require its own proprietary application and configuration interface 104a, 104b and 104c respectively.

In contrast to traditional networking, SDN is characterized by decoupling of network control and forwarding functions. Network control or intelligence is logically centralized in a SDN controller 120, which enables network administrators to dynamically adjust network-wide traffic flow to meet changing needs. Moreover, even as the software-based SDN controllers maintain a global view of the network, it appears to applications 106, policy engines and/or other entities as a single, logical entity. When implemented through open standards (e.g., OpenFlow), SDN simplifies network design and operation because instructions are provided by an SDN controller 120 instead of multiple, vendor-specific devices and protocols. The SDN controller 120 directly controls the physical network devices 108a as well as software network devices 108b (e.g., Open vSwitch) hosted on a server or other hardware.

Referring to FIG. 1B, in a typical networking device 102 such as a router or a switch all intelligence is in the device itself. The device is usually implemented in three planes: data plane 110a, control plane 105a and management plane 115a. Data plane 110a is the layer responsible for moving packets, and is usually implemented in provider proprietary hardware with fixed forwarding methodology. Control plane 105a is the layer responsible for configuring forwarding decisions and exchanges of those with other devices. It may be implemented in hardware and/or firmware with vendor specific protocols and features. This type of implementation leads to existence of complex and dedicated networking devices. Management plane 115 is the layer that provides management interface, and is usually implemented as software in form of command-line interface (CLI). CLI implementation is vendor specific, and hence difficult to automate in multi-vendor environment. Thus, a traditional networking device 102 requires proprietary application and configuration 104 for operation.

Contrary to a traditional networking device 102, the main approach in SDN is separation of control plane and data plane and connecting them, usually, with open protocol. This approach allows control plane protocols and requirements to be deployed separately from data plane thus creating an opening for generalization.

In an SDN device implementation 108, control plane can be implemented on general-purpose CPU, thus reducing complexity of networking hardware and removing complex implementation of protocols in firmware. Furthermore, control plane is no longer tied to specific networking device hence consolidation of all devices' control planes is possible. This consolidation is what is known as the SDN controller 120. It is the SDN controller 120 that provides centralized network intelligence and enables holistic view of the network. Management plane 115b in an SDN device 108 is the SDN application itself. This is the programmable part of SDN and it is targeted to provide freedom of network management and designs specific to users' network needs.

One aspect of "OpenFlow" based SDN is that the data plane 110b operates on flows rather than static lookup tables like MAC table in switches or routing tables in routers. Flows in SDN are best described as pattern matching rules used for packet switching. OpenFlow is vendor-neutral standard and one of the most common protocols used by SDN Controllers to program underlying data plane hardware. This principle of reducing complexity of control protocols to one protocol and enabling flow-based lookups using high-speed memory such as ternary content-addressable memory (TCAM) is what can lead to simplification of infrastructure devices and commoditized hardware.

Figure 1C:
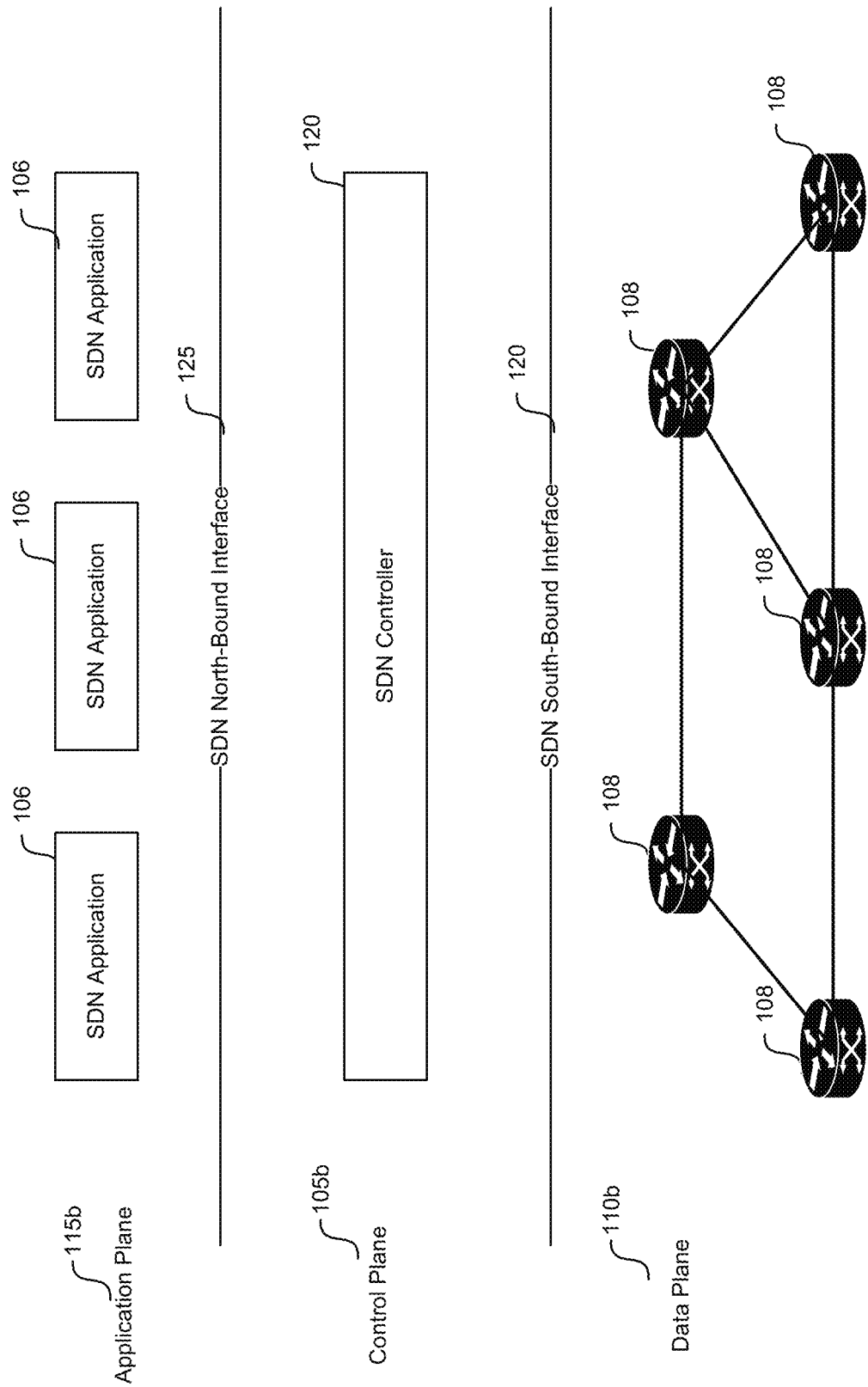
FIG. 1C is a block diagram illustrating SDN architecture.

The purpose of the SDN controller 120 is to separate network control from data path and provide an abstraction of network services. As illustrated FIG. 1C, SDN Controller is a mediator between network application or SDN application 106 and underlying network infrastructure comprising network elements 108.

In the control plane 105a, the SDN controller 120 implements application-controller plane interface (A-CPI) and exposes north-bound interfaces (NBIs) or APIs 125 to users of SDN controller to develop network centric applications without being concerned about network implementation details.

The control plane 105a is the SDN controller 120 itself. This plane represents central intelligence of the SDN network. While the SDN controller 120 can be physically distributed, it is logically centralized in this plane. Detailed architecture of the controller is implementation specific but in general, SDN controller 230 implements Data-controller plane interface (D-CPI) and exposes south-bound APIs 130 to communicate with and directly control network elements or devices 108 residing in the data plane 110b.

The current SDN controller landscape can be divided into open source and proprietary controllers. Open source is targeted mainly at general feature rich SDN controller while proprietary controllers are geared toward specific applications. For interoperability, it is preferable for the SDN controller to be vendor independent. Non-limiting examples of SDN controllers include OpenDaylight (ODL) which offers many network services and south bound protocols and ONOS which offers high performance.

The control plane is centrally managed by the SDN Controller that doles out configurations to the individual switches or network devices. But for SDN capable switches this configuration can be much more versatile and provides a measure of control over the flows never before possible with conventional switches. This control allows communication flows between two devices to be singled out and directed at will throughout the network. For example, consider two different simultaneous communication flows between two devices, for example HTTP and Modbus TCP. With SDN, the two flows can be directed through very different paths through the network. The Modbus TCP may take a direct path between the two devices while the HTTP may be directed into a cloud platform through a virtual firewall, and then on to the other device. This is not possible with conventional switches as these switches have no visibility into the content of the messages and are relegated to an all or nothing control over the communications between the two devices.

This level of control over the flows obviates the need for the tiered and segmented architecture used today in industrial networks. Accordingly, enabled by the SDN controller, each flow can be individually controlled to implement a simple flat network for use by all devices connected at the same topological level.

One advantage of the granular level of control of the flows is an increased level of security because only sanctioned flows are allowed into the segment. This capability to control the flows can also be exploited for network and device redundancy. For network redundancy, the SDN controller can redirect flows around links that are down or are experiencing some degradation of performance. This same capability could be used to load balance the network links.

In this manner, SDN can provide unprecedented control over flows within a network and thereby enable flat network architectures for use in the ICS. The SDN controller can manage the flows within the network to provide the necessary flow separation that was previously accomplished with complex hierarchical topologies, enabling implementation of simpler and easier to manage flat architectures in the ICS.

Figure 1D:
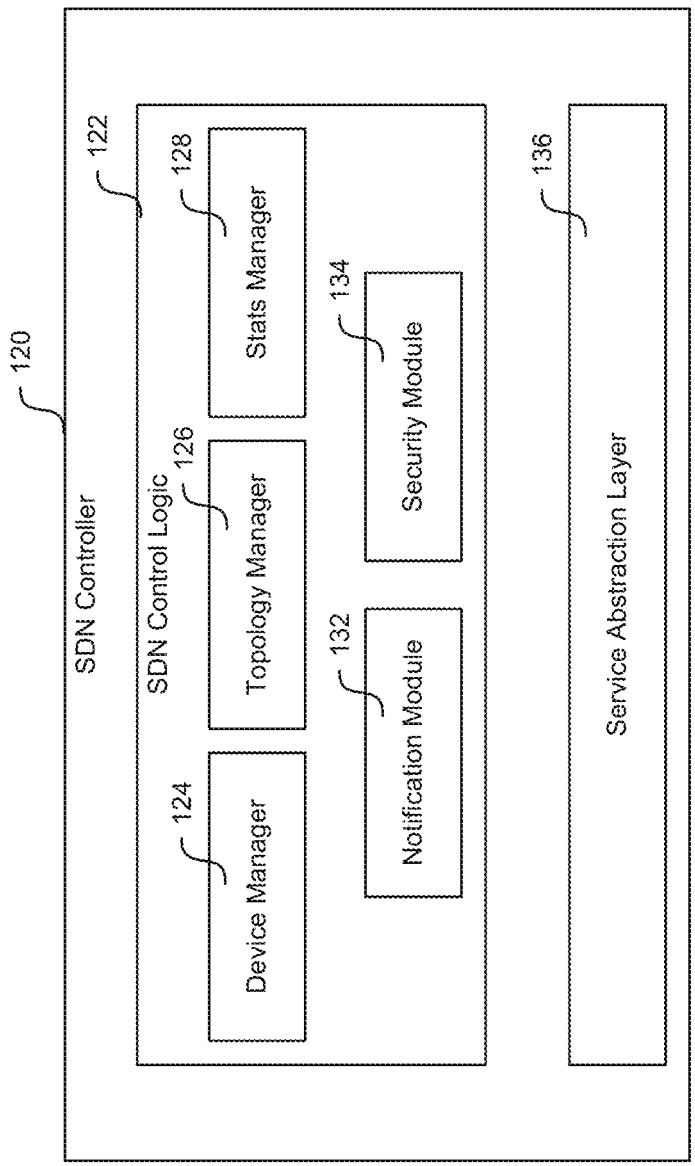
FIG. 1D is a block diagram illustrating example components of an SDN controller.

Many different SDN controllers have been proposed or are available in the market, and as previously noted, the architecture of an SDN controller is implementation-specific, with different controllers having different sets of components and properties. An SDN controller 120 with an example set of components is illustrated in FIG. 1D. Some SDN controllers include a service layer abstraction (SLA) 136 which supports coexistence of several different south-bound APIs (e.g., OpenFlow, OVSDB) and protocols (e.g., SNMP, NETCONF). All SDN controllers include some form of SDN control logic 122 that utilize network control functionalities provided by components such as a device manager 124, a topology manager 126, a stats manager 128, a notification module 132, a security module 134, and/or the like. The device manager 124 can manage devices in the network. For example, the device manager 124 can detect when a device is added to or removed from the network. The topology manager 126 can detect topology changes in the network and maintain an up-to-date topology of the network. The stats manager 128 can collect statistics relating to the monitoring of network functions and devices (e.g., flow statistics generated by the forwarding devices). The notification module 132, for example, can receive, process and take an action with respect to events (e.g., alarm notifications, state changes). The security module can provide security enforcement.

Figure 2:
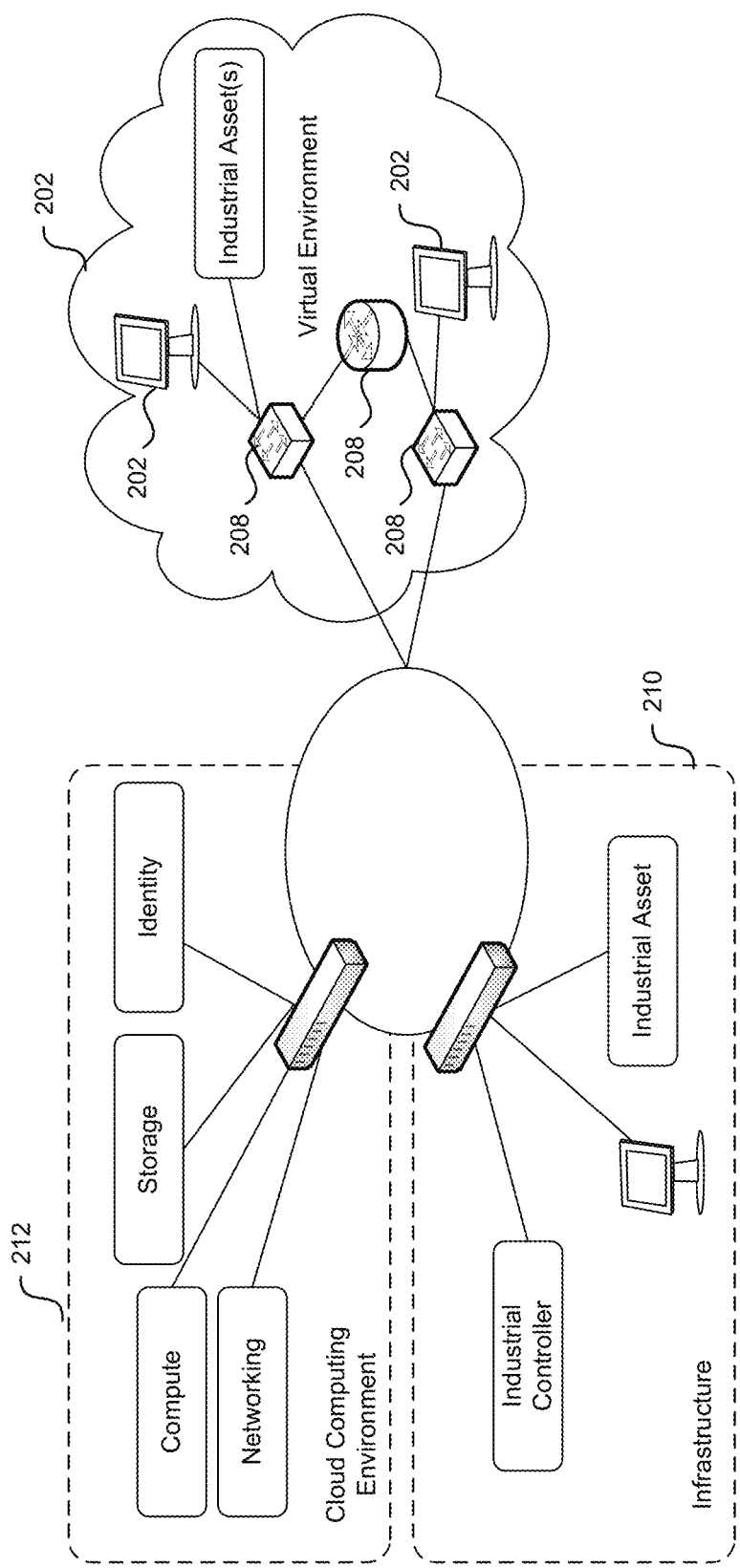
FIG. 2 is a block diagram illustrating industrial SDN control domain in accordance with some embodiments.

FIG. 2 is a block diagram illustrating industrial SDN control domain in accordance with some embodiments. SDN can be deployed in an industrial environment to manage the industrial network and devices. In addition to the real physical network devices and real physical industrial devices, the infrastructure layer 110b can also have virtual network devices and virtual industrial devices. Devices depicted in the virtual environment 202 are virtualized instances of physical devices including network devices 208 such as switches, routers, firewalls, and the like, and other devices such as PCs 202, PLCs 206, and the like. They are connected via virtual links. The network of virtual devices with virtual connections is referred to as virtualized network. Virtual devices and networks reside on physical server nodes in a cloud computing environment 212 which provides compute, storage, identity and networking resources. The cloud computing environment 212 is part of the real network. This means that real network and virtualized network are interconnected to form the control domain of the SDN controller.

Some infrastructure devices in the industrial domain integrate infrastructure and end device into one device. For example, a PLC that acts as a PLC and as a switch. As such, these types of industrial devices are suitable for direct management by SDN controller. To be managed by the SDN controller, the device should implement at least one south bound interface of a selected SDN controller. One example solution is to have such a device implement the OpenFlow or similar protocol. Implementation of OpenFlow at an industrial device level would bring SDN control to the device level.

2. TIME-SENSITIVE NETWORK (TSN)

Time-sensitive network (TSN) is one of the major set of technologies driving fully deterministic real time communication. TSN achieves deterministic real time communication by using centralized control, time synchronization, and scheduling. In a TSN network, messages or data packets are transmitted based on a time schedule and priority to guarantee a maximum bounded latency and reliability. As such, TSN technology can enable control applications, such as those in industrial and automotive domains to transmit time-critical data over a standard Ethernet infrastructure, obviating the need for specialized protocols to handle real time data.

Infrastructure devices adhere to classical network device architecture in sense that they have:
  (i) Data Plane—where actual forwarding occurs
  (ii) Control Plane—where forwarding decisions are configured
  (iii) Management Plane—where device is managed by its owner Infrastructure can then be characterized based on device network capabilities and purpose. From the network perspective, there are following types of devices:
  (i) Edge devices—devices that produce and/or consume data such as PLCs and I/O.
  (ii) Transport devices—devices like switches and routers that simply forward data through network
  (iii) Network Service devices—devices that preform data processing and forwarding such as DPI Based on the above classification of devices, the entire conversation about infrastructure can actually be transformed to a conversation about data in which infrastructure transports and policies that govern data distribution.

Data (e.g., in industrial domain, in automotive domain) can be described as:
  (i) Time-sensitive Data (TSD)—This type of data requires delivery from producer to consumer reliably and instantly. As such it requires end to end time awareness with six nines reliability. Application response time (ART) for this type of data is typically viewed as less than 1 ms.
  (ii) Time aware Data (TAD)—This type of data is expected to have deterministic qualities. While it is not time-sensitive it is time aware by having a notion of timeout. ART for this type of data is approximately in milliseconds range.
  (iii) Best effort Data (BED)—This type of data is non-essential information which can be simply translated to general network traffic with best effort service.

The above data types can be associated with the following networking Standards:
  (i) TSN (IEEE 802.1AS-rev, IEEE 802.1Qbv, IEEE 802.1Qbu, IEEE 802.1Qca, IEEE 802.1CB, IEEE 802.1Qcc, IEEE 802.1Qci, IEEE 802.1Qch): controlling and governing time-sensitive data
  (ii) QoS (IEEE 802.1Q, IEEE 802.1P): controlling and governing Time aware data and Best Effort Data

3. TIME-SENSITIVE SDN (TSSDN)

While SDN allows unprecedented and granular control of network resources and flows, it has no notion of time. SDN controllers can implement conventional time stamping mechanisms for stamping each message with the time it was received or sent. However, such mechanisms do not have a notion of time in the sense that they cannot interpret or understand the implications of time. For example, an SDN controller/device is not capable of rejecting packets received after midnight, or allowing packets to transition through a network device between 1 am and 4 am. Similarly, an SDN controller can determine a path through the network infrastructure, but such a path does not consider whether the data to be transmitted is time-sensitive, time-aware or best effort.

Figure 3A:
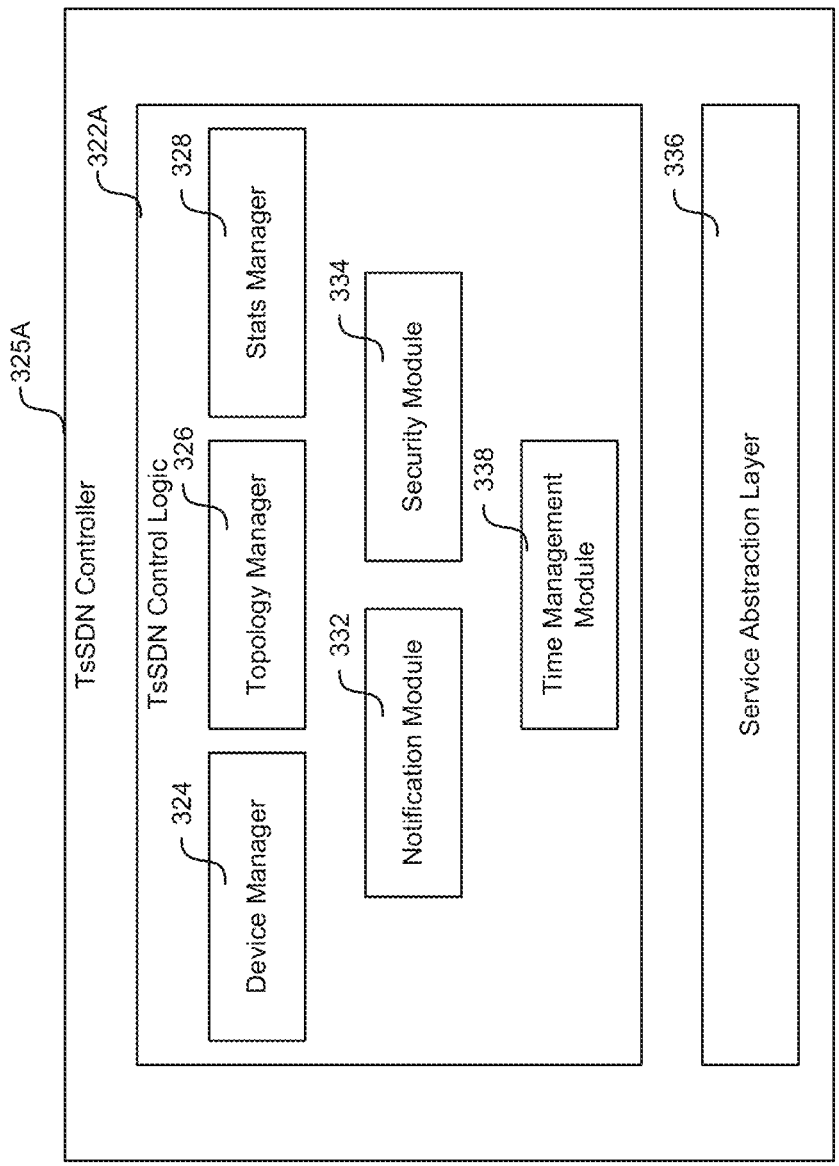
FIG. 3A is a block diagram illustrating example components of a Time-Sensitive SDN (TsSDN) controller in accordance with a first embodiment.

In accordance with the present disclosure, this limitation of the SDN technology can be overcome by integrating time domain management into the SDN controller to create a time-sensitive SDN (TsSDN) controller. Example components of a TsSDN controller in accordance with a first embodiment is depicted in FIG. 3A. The TsSDN controller 325A includes a TsSDN control logic 322A having a device manager 324, a topology manager 326, a stats manager 328, a notification module 332 and a security module 334. These components have similar/same functions as the components of the SDN controller 120 of FIG. 1D. The TsSDN control logic 322A also includes a time management module 338 responsible for bringing time awareness. The time management module 338 can have a north-bound interface for interfacing with applications and a south-bound interface for interfacing with network devices.

Bringing time awareness to the SDN controller does not necessarily mean full implementation of TSN requirements (i.e., the entire suite of TSN protocols). In some embodiments, time awareness can include the ability to differentiate flows (for Open Flow implementation) or data that are time-sensitive from those that are not. TsSDN controller would then be able to separate time-sensitive paths from general traffic paths and therefore create appropriate overlays to accommodate differentiation of device capabilities with respect to time awareness. In this manner, the TsSDN controller can provide end to end management of ART by using the principles of the TSN technologies including centralized management and global time as well as time awareness. TsSDN would thus be able to guarantee transport of messages across the network comprising TSN capable devices (or TSN devices) with bounded low latency, low packet delay variation and low packet loss. TSN capable devices, as used herein, are devices including network devices supporting or implementing some or all of the TSN protocols. In some embodiments, example methods implemented by the time management module 338 are described in reference to FIGS. 6A-6D.

A TSN includes TSN devices or entities implementing TSN protocols relating to control and governing of time-sensitive data. Although, the TSN technology is fast evolving in a direction where a special TSN configurator can configure the entire TSN, the technology still relies on specific hardware adhering to specific standard definitions and information exchange among TSN entities using pre-defined protocols and a sort of exclusive network. The TsSDN controller, on the other hand, takes over the responsibilities of devices' control plane. For example, the TsSDN controller can implement SRP on behalf of all devices. Similarly, OpenFlow as an SDN protocol can be extended to meet the TSN arsenal of protocols. With proper merger of functionality, a TsOpenFlow can be created to configure all aspects of the TSN devices directly from the TsSDN controller.

Figure 3B:
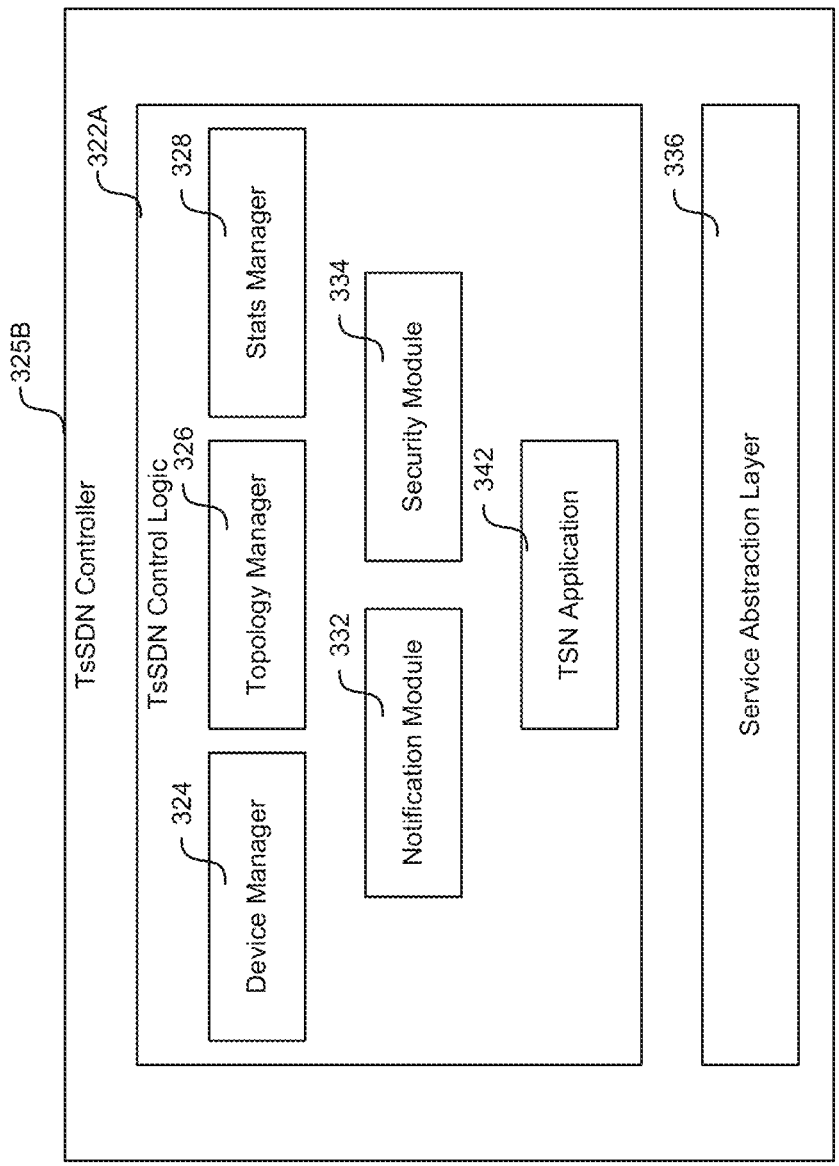
FIG. 3B is a block diagram illustrating example components of a TsSDN controller in accordance with a second embodiment.

FIG. 3B illustrates example components of a TsSDN controller 325B in accordance with a second embodiment.

In this embodiment, the SDN controller can be integrated with a TSN application 342 by extending the controller (e.g., Open Daylight) to implement a TSN application 342 which uses a southbound interface to directly sense and control capabilities of TSN devices. In this case, Open Flow protocol may not be used to implement time domain but rather to configure TSN devices in such way that it preserves TSN established time domain.

Figure 3C:
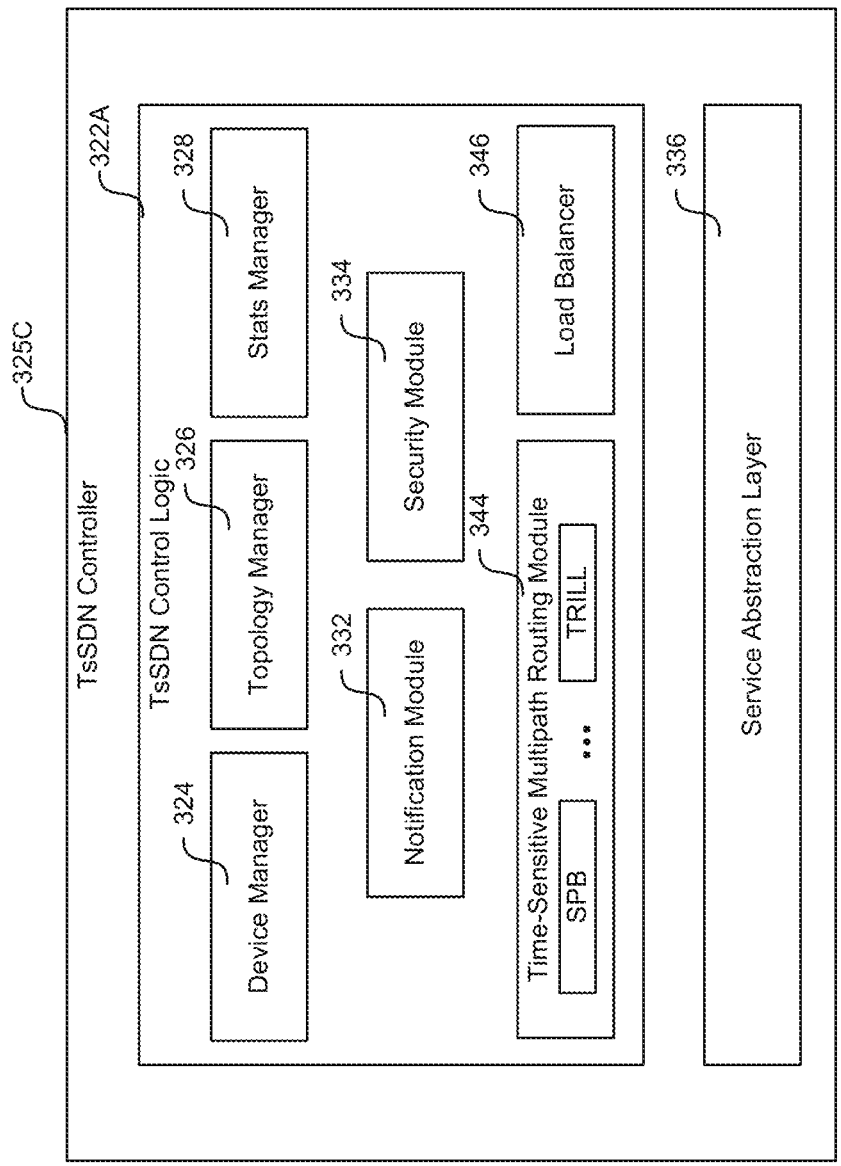
FIG. 3C is a block diagram illustrating example components of a TsSDN controller in accordance with a third embodiment.
Figure 3D:
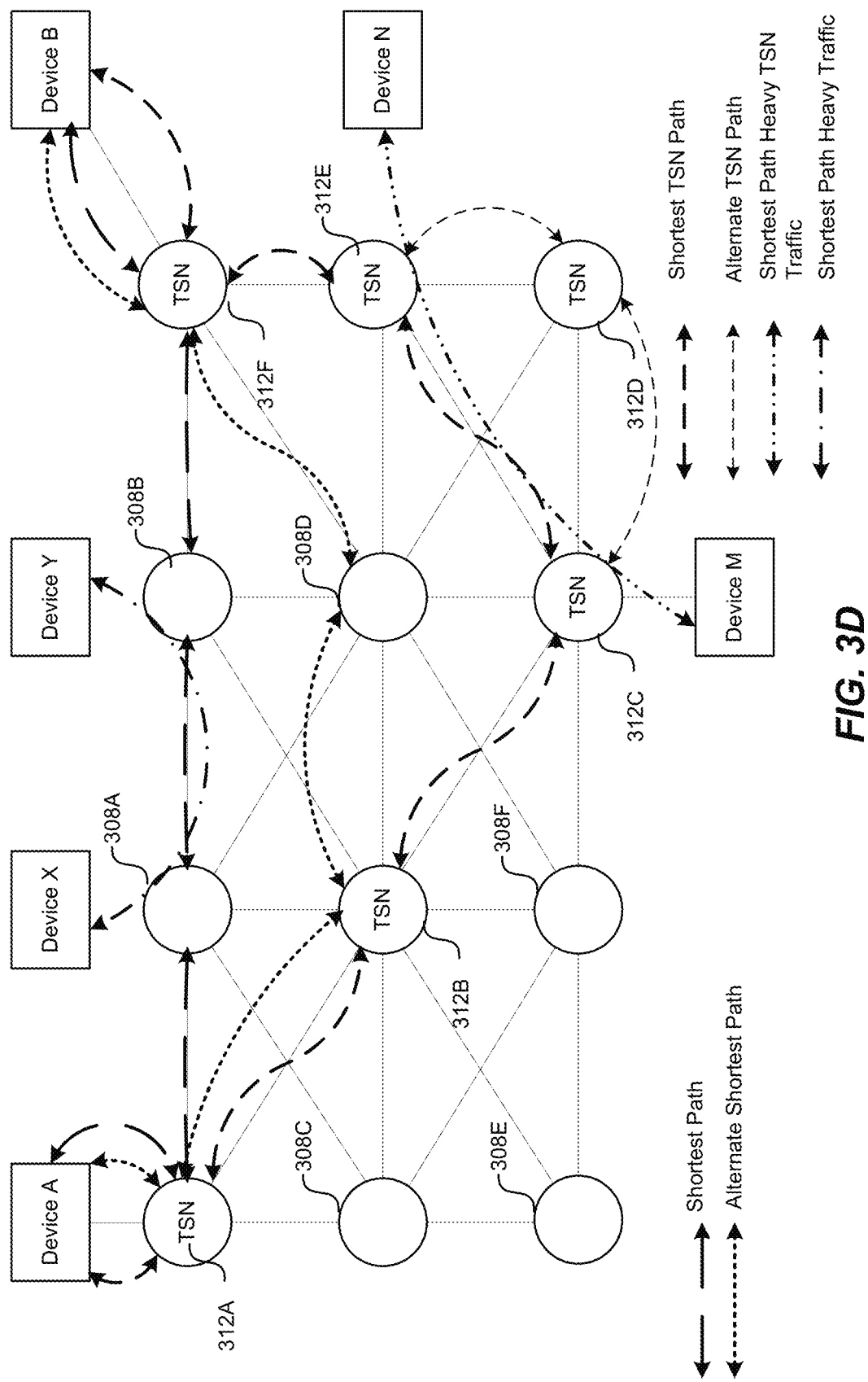
FIG. 3D is a block diagram illustrating alternate shortest paths determined by the TsSDN controller in accordance with the third embodiment.

FIG. 3C illustrates example components of a TsSDN controller 325C in accordance with a third embodiment. In this embodiment, a time-sensitive multi-path routing module 344 can be provided for centralized calculation of the most efficient paths for routing, thereby providing redundancy and increasing reliability of the overall Ts-SDN controlled network. The module 344 can implement any of the link state protocols such as the shortest path bridging protocol (SPB), transparent interconnection of lots of links (TRILL), and the like, and use techniques such as equal cost multi-tree (ECMT), Dijkstra algorithm and/or traffic engineering to determine or calculate the most efficient paths based on time-sensitivity and/or network load. One specific implementation of the time-sensitive multi-path routing module 344 can be a time-sensitive SPB module (Ts-SPB module) that implements the shortest path bridging (SPB) protocol. SPB protocol is a standardized protocol specified in the IEEE 802.1aq standard which creates the shortest path of communication between network entities. In standard networks, it is implemented by each network device in its firmware. In this example, the SPB protocol implementation can be moved to the TsSDN controller 325C (e.g., in Ts-SPB module), and in conjunction with OpenFlow or other control protocols, the TsSDN controller 325C can generate a centralized view of all the shortest paths. In this example, the SPB protocol is augmented to include time and network load as attributes in equal cost multi-tree (ECMT) routing. In accordance with this embodiment, the Ts-SPB module can, using the augmented SPB protocol and the ECMT technique create or determine alternate shortest paths based on time sensitivity or load of the network, or a combination thereof. Congestion information that is indicative of network load can be collected by a SDN load balancer 346. This behavior is illustrated in FIG. 3D which depicts a number of shortest paths through TSN devices 312 and non-TSN devices 308 that the Ts-SPB module can determine. In the diagram, the shortest path for transporting packet flows from device A to device B is shown to be through network devices 312A, 308A, 308B, 312F and an alternate shortest path from device A to device B is through network devices 312A, 312B, 308D, 312F. For both paths, no guarantees are provided with respect to time, and as such these paths may not be suitable for time-sensitive packet flows. Nevertheless, packet flows can be distributed between the two paths for load balancing. Also depicted in the same diagram is the shortest TSN path from device A to device B through network devices 312A, 312B, 312C, 312E, 312F. An alternate shortest TSN path can be through network devices 312A, 312B, 312C, 312D, 312E and 312F. Both TSN paths provide guarantee with respect to time, and as such packet flows can be distributed between the two TSN paths for load balancing. When network congestion is taken into account, the shortest TSN path is no longer the same. In the diagram, the shortest path for heavy TSN traffic from device M to device N is through network devices 312C and 312E. This network path provides the shortest path that is time-sensitive. Finally, the shortest path for heavy traffic that is non-time-sensitive from device X to device Y can be through network devices 308A and 308B. This path is the shortest path that is not time-sensitive. In this manner, the TsSDN controller 325C, via the Ts-SPB module and load balancer 346 can determine shortest paths bridging that is also time-sensitive and load balanced, bringing all aspects of traffic engineering under the realm of the TsSDN controller 325C.

In some embodiments, a Dijkstra algorithm can be utilized by the time-sensitive multi-path routing module 344 to identify the shortest path for TSN traffic and/or non-TSN traffic through the network. The Dijkstra algorithm continuously eliminates longer paths between the source or starting node and all possible destination nodes. Longer paths can have higher cost which is typically attributed to link speed (i.e., cost is inverse of link speed). The algorithm starts out by having confirmed or visited and unconfirmed/unvisited sets. Nodes in the unconfirmed sets have a path to the initial node, but are pending evaluation. Nodes in the confirmed sets have been evaluated. The following steps may be taken:
1. Set distance of the initial node to 0.
2. Set all other distances to a very high value.
3. Set the initial node as current and add all the nodes to the unconfirmed set.
4. Repeat the following steps a-c while the unconfirmed set is not empty:
    a. from the current node, calculate distances to all its neighbors and compare the newly calculated distances to the current assigned values and assign the smaller one.
    b. add the current node to the confirmed set, and remove from the unconfirmed set once step a is completed.
    c. select a node from the unconfirmed set that is the shortest distance and set it as the new current node.

The result of this algorithm is the determination of the shortest path from the initial node to all possible destinations. To have the network capable of determining the shortest path, the Dijkstra algorithm has to be implemented on each network device, which adds to the complexity of the network device. Moreover, the algorithm does not take into account time and load based costs. For example, a highspeed path through a network device A may have 50% of its bandwidth reserved, causing the data plane to be fully loaded. This load information can be used to avoid the highspeed path, for example for time-sensitive traffic. A Dijkstra algorithm that has been enhanced to include load and time based costs that overcomes these and other problems of the Dijkstra algorithm will now be discussed.

Figure 3E:
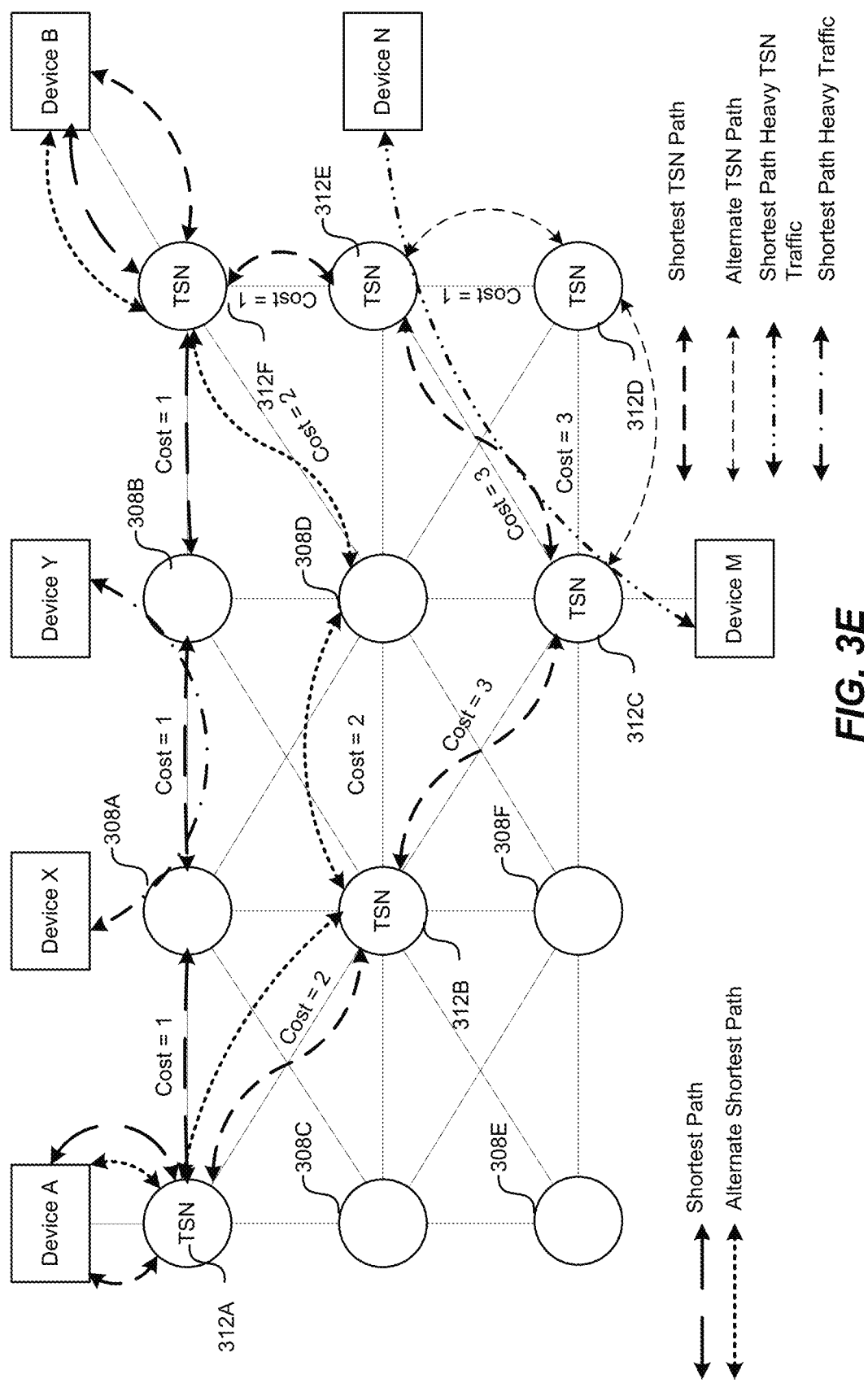
FIGS. 3E and 3F are block diagrams illustrating implementation of a modified Dijkstra algorithm that takes into account load and latency based cost to determine the shortest path through the network in accordance with some embodiments.

An example of the enhanced Dijkstra algorithm that can be implemented by the TsSDN controller 325C (e.g., via the time-sensitive multi-path routing module 344) is illustrated in FIG. 3E. In the diagram, some of the paths are associated with cost values. All unmarked paths are assumed to have a cost of 100, and so these unmarked paths will not be sorted and will not be selected by the modified Dijkstra algorithm. In this example, network paths are evaluated based on a load based cost. In other words, the cost calculation can take into account network load conditions. Other additional factors such as link speed may be included in the cost calculation in some embodiments.

The Dijkstra algorithm can determine that shortest path between Device A and Device B is through network devices 312A, 308A, 308B, 312F because the path cost is 1+1+1 or 3 as opposed to 2+2+2 or 6 through network devices 312A, 312B, 308D, 312F. Now suppose heavy traffic is running between device X and device Y through network devices 308A and 308B. When the TsSDN controller detects such traffic levels (e.g., using OpenFlow diagnostic features), it can dynamically change cost of link between network devices 308A and 308B to a load based number. For example, if the load is 50%, adding 50 to the existing cost would result in a new cost of 51. Now when the Dijkstra algorithm is run again, it will yield 1+51+1 or 53 for the path through 312A, 308A, 308B, 312F while the path through 312A, 312B, 308D, 312F will have the cost of 2+2+2 or 6. In this example, the second path will be the shortest path and hence will be chosen for packet transport.

Time-sensitive data may be treated in a similar manner. In this case, in addition to load based cost, there would be latency based cost. That means the slower the network device, the bigger the latency and thus the cost. For example, referring to FIG. 3F, let's take only TSN path in consideration. The Dijkstra algorithm can determine the cost of the fast unloaded path through network devices 312A, 312B, 312C, 312E, 312F is 2+3+3+1=9. The slow unloaded path through network devices 312A, 312B, 312C, 312D, 312E, 312F is 2+3+3+1+1=10. Now assuming some additional load on 312C and 312E, the cost of the first path would be updated to 2+3+53+1=59. In this instance, the second path would be selected for transporting TSN traffic. In this manner, the TsSDN controller which is aware of how many TSN streams go across a single point in the network can adjust cost of links to that device and recalculate the shortest path accordingly.

Figure 3F:
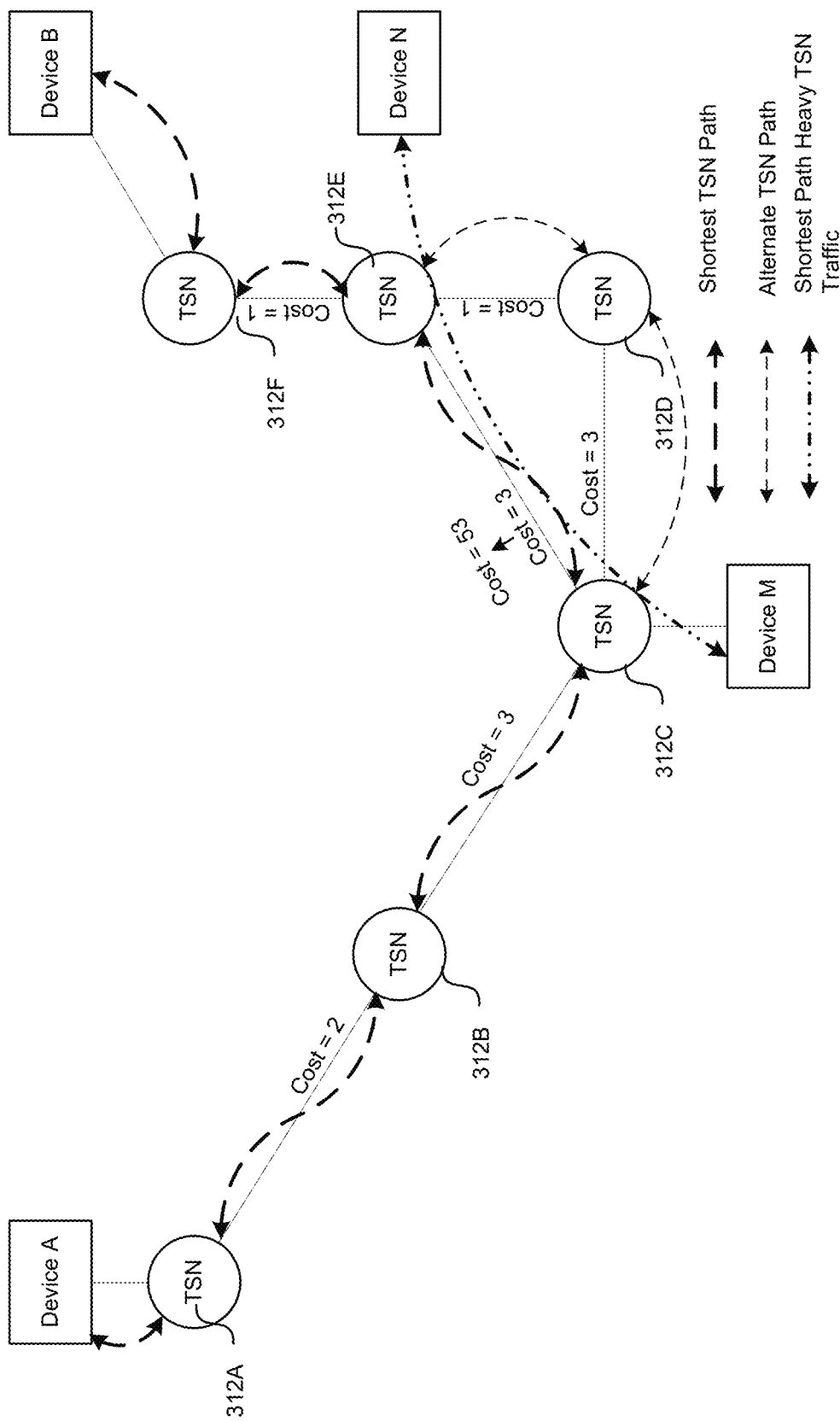

Moreover, as shown in FIG. 3F, TSN devices can be easily isolated from non-TSN devices. This is another advantage of the centralized system. This centralization enables Dijkstra algorithms enhanced by load and latency based cost considerations to run on subsets of the network or the entire network.

Figure 3G:
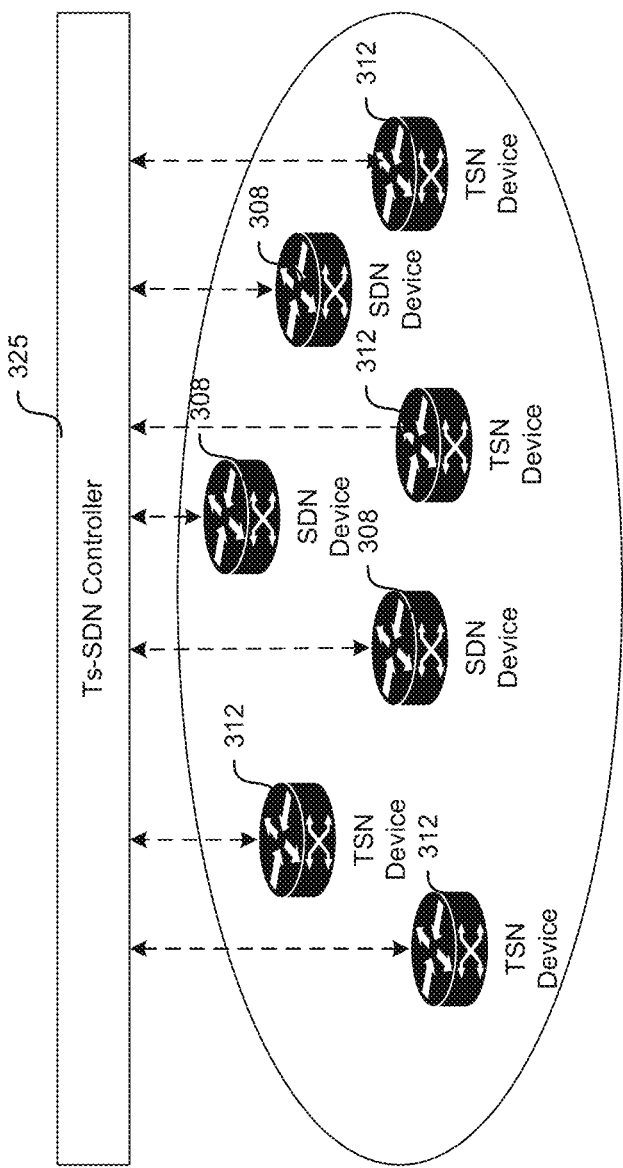
FIG. 3G is a block diagram illustrating infrastructure devices managed by a TsSDN controller in accordance with some embodiments.

FIG. 3G is a block diagram illustrating the network infrastructure under the management of a TsSDN controller. As depicted, the TsSDN controller can manage TSN devices 312 which implement the TSN protocols to provide guaranteed transport of messages from one device to another across the network. Existing network infrastructure is likely to have non-TSN devices 308 in addition to TSN devices 312, as depicted. In such instances, the SDN devices 312 are also managed by the Ts-SDN controllers. The Ts-SDN controller 325 can directly program each of these TSN devices 308 and SDN devices 312 to implement various network policies including how to manage or process (e.g., prioritize, forward/reject) different classes of data.

Figure 4:
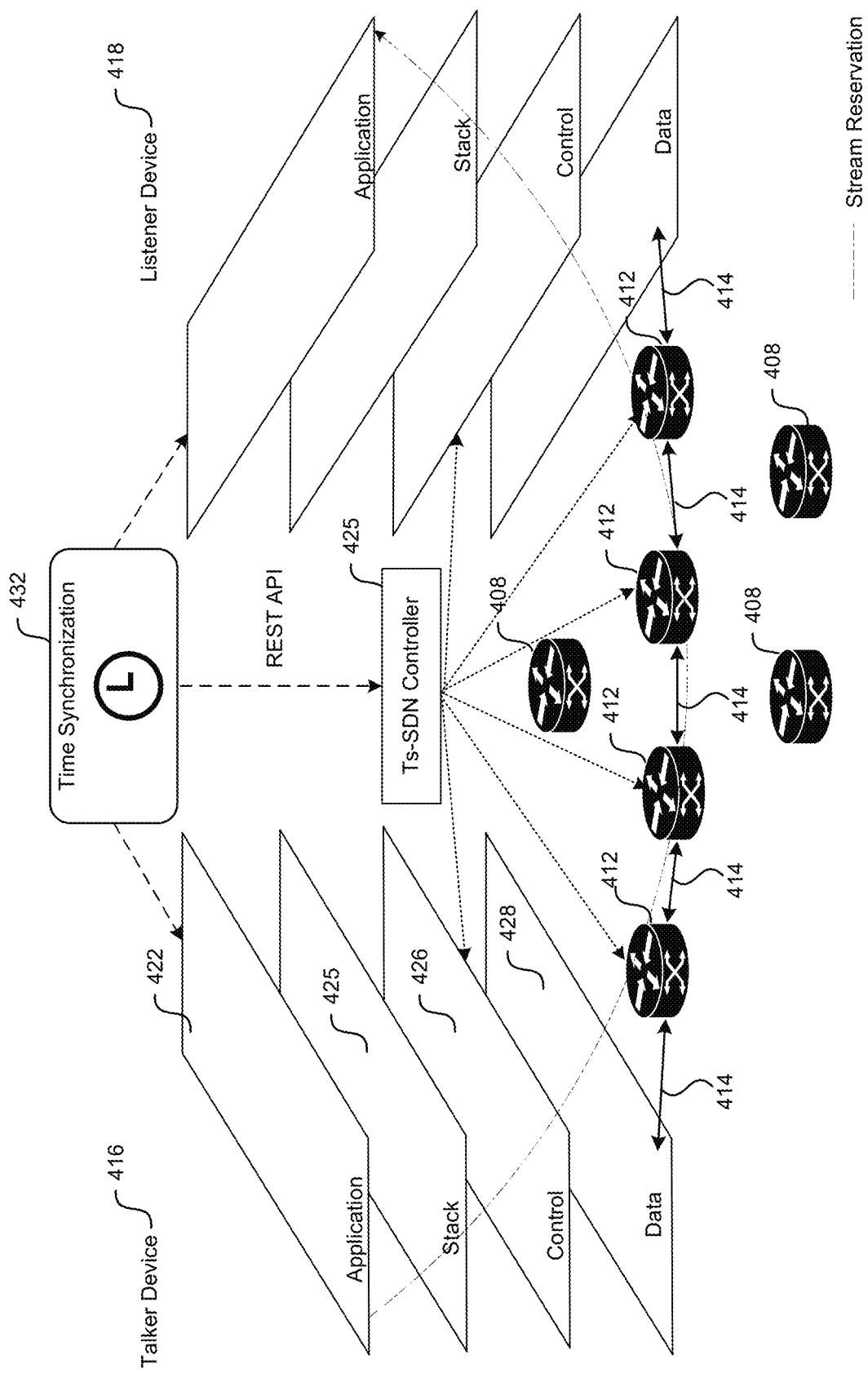
FIG. 4 is a block diagram illustrating discovery of a network path through an infrastructure comprising a mix of time-sensitive network (TSN) and non-TSN devices for delivering time-sensitive data with guaranteed deterministic performance.

FIG. 4 depicts communication between a talker device 416 and a listener device 418 across a network infrastructure that comprises a mix of TSN devices 412 and non-TSN devices 408 that exist in the same time domain. In "SDN as underlay" deployment model entire control of networking infrastructure (e.g., 408, 412) from all networking perspectives is managed by the TsSDN controller 425. This means that underlying protocols such as Open Flow and TSN suite of protocols are directly controlled by SDN. Moreover, the TsSDN controller 425, the talker device 416, the listener device 418 as well as the network infrastructure implement time synchronization 432. Time synchronization 432 is achieved by having the real-time clocks of all devices synchronized to a master clock with great accuracy (e.g., in nanosecond range). This provides a common time base for messages conjured at the talker device and presented at the listener device to have the same relative timing.

Time-sensitive SDN can be viewed as comprising a control plane, a data plane and time domain. The control plane implements the TsSDN controller, while the data plane realizes communication by providing data transport in timely manner. Time Domain enforces time awareness in SDN control domain. The planes are connected with two notions of responsibility:

(i) Orchestration: Responsibility for automated arrangement, coordination, and management of complex networking elements and protocols to serve a time-sensitive application.

(ii) Information: Responsibility for collection, analysis, interpretation, presentation, and organization of network information which in turn enables a time-sensitive application to react to network conditions.

In some embodiments, SDN as the ultimate controller of entire network has potentially ultimate control of time domain, either through isolated path selection or thorough deployment and orchestration of TSN. This ultimate control makes it suitable for assurance of truly deterministic data delivery on network level.

Consider an example of a brownfield industrial network where there is mixture of TSN aware devices 412 and unaware devices 408. TsSDN controller 425 can discover and ensure time a network path for time-sensitive messages through the existing infrastructure. To discover a network path that meets the time sensitivity requirements of messages to be transported, end to end delay for the messages needs to be determined. Typically, network delay calculations account for delay only in the data plane of the network, i.e., from one network device to another. However, in reality, starting from the time a data packet is conjured at the application layer 422, the data packet transitions through several layers before reaching the data plane 428. For example, at a talker device 416 (i.e., the source of the data packet or transmitting device), the data packet transitions from an application layer 422 through a stack 424 which includes the operating system providing a means of communication (e.g., TCP/IP stack, UDP stack, Linux, Windows, etc.) before transitioning to the control plane 426 and finally to the data plane 428 of the talker device. From thereon, the data packet transitions to the data plane of the network which includes forwarding elements 408, 412, i.e., network devices responsible for transport across the network. The data packet then transitions through the control plane 426, the stack 424 and application layer 422 of the listener device 418 (i.e., receiving device). The delay the data packet encounters at each of these transitions through the layers are accounted for in calculating end to end delay. The TsSDN controller 425 can calculate the end to end delay as time synchronization 432 enables delay at the talker device level 416, delay at the listener device level 418 and delay at the network data plane level to be propagated to the TsSDN controller In FIG. 4, the TsSDN controller has discovered a network path for transporting a time-sensitive message from the talker device 416 to the listener device 418 using only the TSN devices 412. The network path 414 guarantees that the end to end delay for the time-sensitive message meets the timing requirement of the time-sensitive message or application that conjured the time-sensitive message, and thus achieves end to end deterministic communication.

Figure 5:
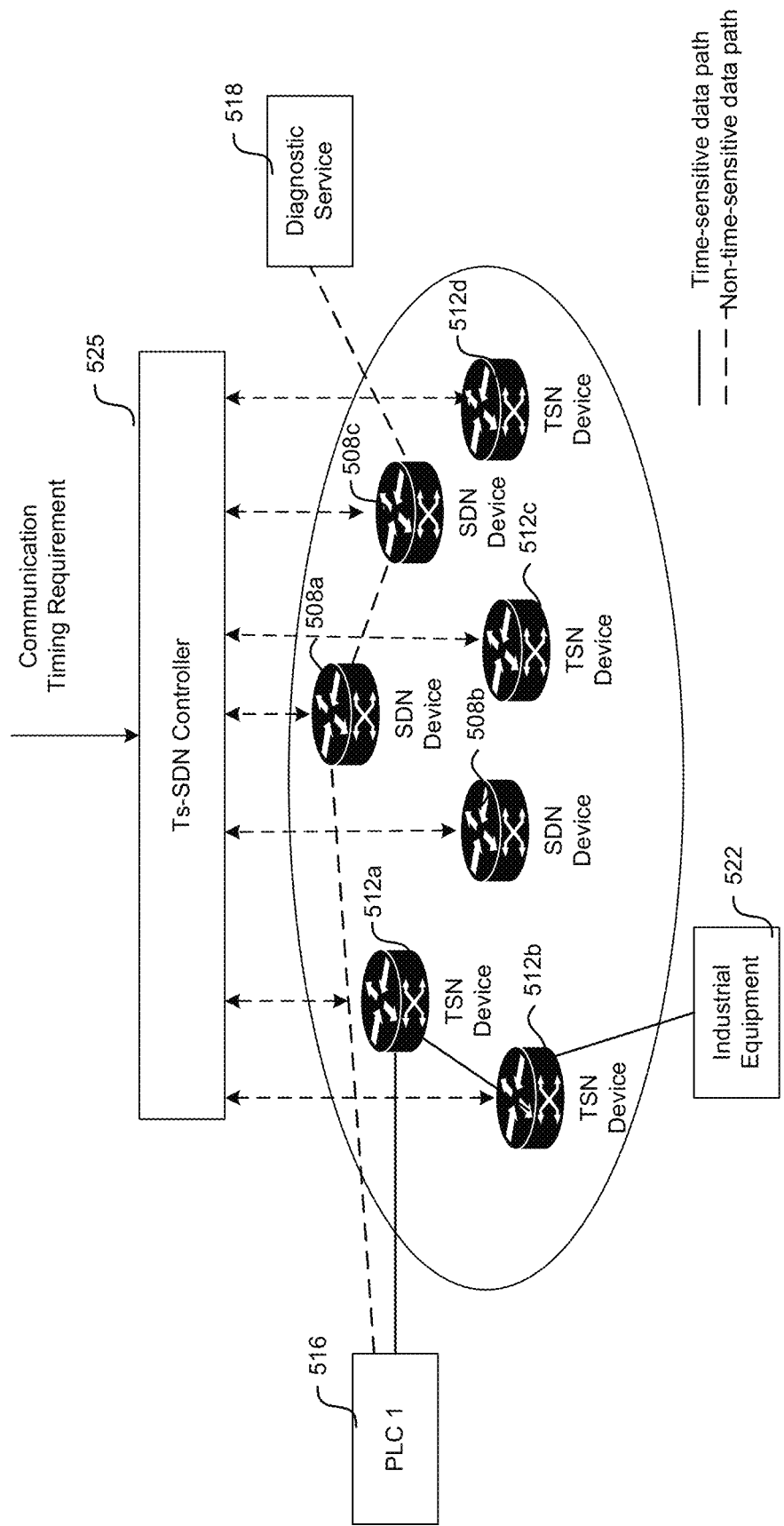
FIG. 5 is a block diagram illustrating handling of time-sensitive and non-time-sensitive communication

In SDN/OpenFlow, a flow is a sequence of packets between a source and a destination. FIG. 5 depicts handling of time-sensitive and non-time-sensitive flows by the Ts-SDN controller (e.g., 325A, 325B, 325C) in an industrial domain. An example PLC device 516 can produce two flows including data packets that are to be transported to a diagnostic service 518 and an industrial equipment 522 respectively. When a data packet associated with a flow to be delivered to the industrial equipment 522 is received by a network device, it is first forwarded or reported to the Ts-SDN controller 525 if the network device has no rule for forwarding the data packet. The TsSDN controller 525 then determines whether the data packet includes time-sensitive or time-aware data. As previously described, time-sensitive data (TSD) is mission-critical data that requires instant and reliable delivery, with ART often less than 1 ms, while time-aware data (TAD) has an ART that is typically in the millisecond range. In some embodiments, whether a data packet has TSD or TAD can be determined based on information received from the source device. For example, when a user qualifies or specifies a traffic as TSD or TAD (e.g., via an industrial control application executing on the PLC 516 or via a network application that interfacing with the TsSDN controller 525), each such qualification can be translated to network configuration information which may be in the form of VLAN ID groups, QoS parameters, and the like. In some implementations, the network configuration information indicative of time-sensitivity characteristic may be included in a stream reservation protocol (SRP) talker advertise message. In other words, the TsSDN controller 525 can based on any SRP activity (which is a TSN specific protocol) detected from the source device determine that the data packet includes TSD. The TsSDN controller 525 can further detect that a data packet from the source device is TAD based on QoS parameters associated with the data packet. All other data packets can be considered best effort. If the data packet is time-sensitive, the Ts-SDN controller 525 determines a network path with a maximum latency such that the end to end delay for the data packet is less than the time-sensitivity requirement associated with the data packet. In some implementations, the TsSDN controller 525 can obtain time-sensitivity requirement from the industrial control application executing on the PLC 516 or via a network application that interfacing with the TsSDN controller 525, e.g., via RESTFULL interface on the northbound side of the controller. The end to end delay, as previously described, can be calculated based on information associated with the source device (i.e., PLC 516) and/or the destination device (i.e., industrial equipment 522) and the network devices. In some embodiments, the intent of network usage including associated delay or latency contributing to the end to end delay, time-sensitivity characteristic of data packet, and the like can be reported by the source and/or destination devices and network devices to the TsSDN controller. The capability of the network devices (e.g., associated latencies, available bandwidth, type of data packets in queue) can be determined by the Ts-SDN controller by direct interrogation. Referring to FIG. 5, the network path discovered for transporting time-sensitive flow from PLC 516 to the industrial equipment 522 is through TSN devices 512a and 512b. The TsSDN controller 525 selects this path comprising only time-sensitive devices to guarantee end to end delay in the transport of the data packets associated with the flow meets the strict timing requirement associated with the time-sensitive data.

As for the second flow from PLC 516 to the diagnostic service 518, the TsSDN controller 525 can similarly determine, based on the content of a data packet associated with the flow, whether the flow is time-sensitive or time-aware. Suppose the flow is determined by the TsSDN controller 525 to be neither (i.e., best effort data), then the TsSDN controller 525 can determine a network path through only non-TSN devices. As depicted in FIG. 5, the network path for the best effort flow is through SDN device 508a and 508c.

Figure 6A:
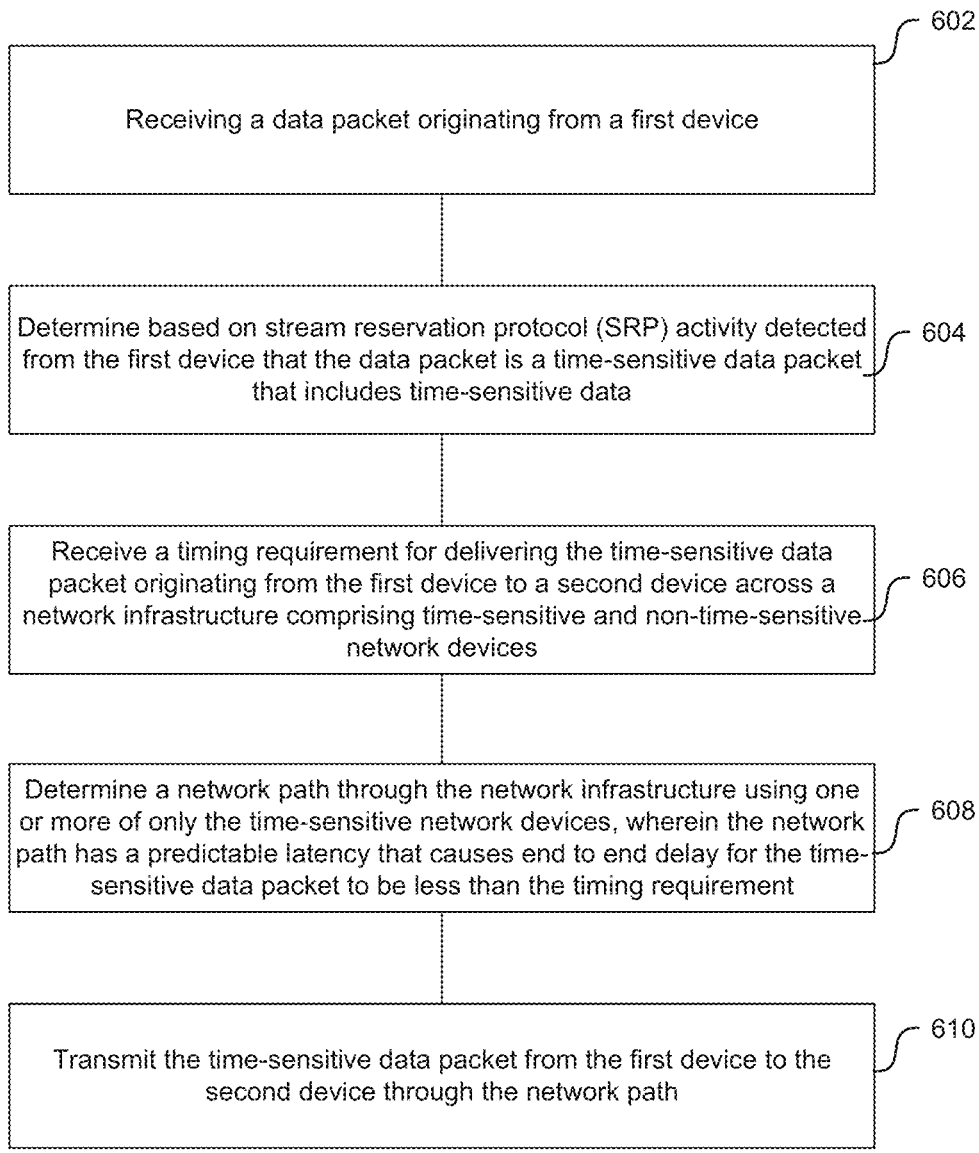
FIGS. 6A, 6B and 6C are logic flow diagrams illustrating example methods of transmitting time-sensitive, time-aware and best-effort data packets respectively through a network infrastructure comprising time-sensitive and non-time-sensitive network devices.
Figure 6B:
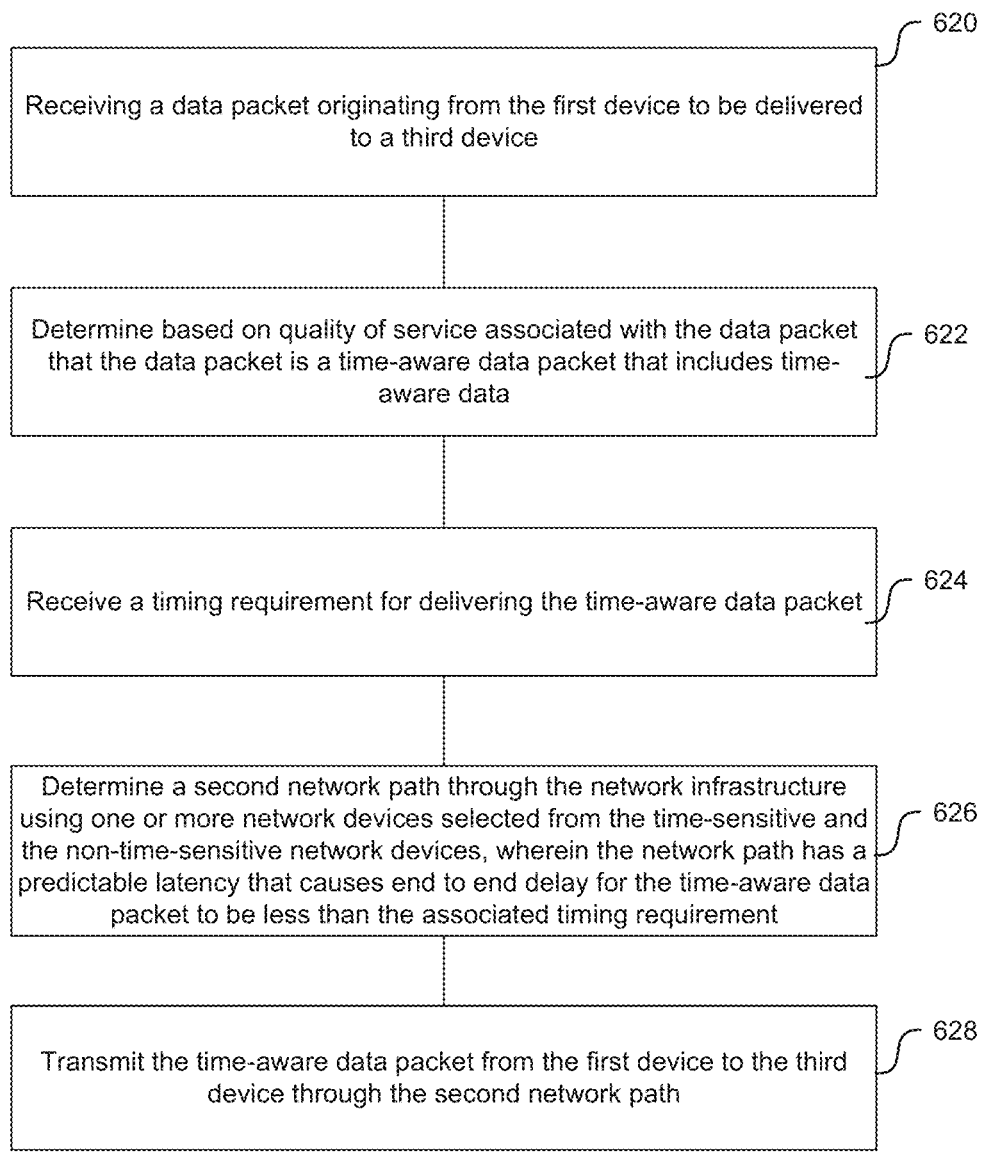

FIG. 6A is a logic flow diagram illustrating an example method of transmitting a time-sensitive data packet through a network infrastructure comprising time-sensitive and non-time-sensitive network devices. The example method comprises at block 602, receiving a data packet originating from a first device and directed to a second device across a time-sensitive SDN. The TsSDN controller based on network configuration information associated with the data packet (e.g., SRP activity, QoS, VLAN ID groups) can determine that the data packet is a time-sensitive data packet that includes time-sensitive data at block 604. At block 606, the TsSDN controller can receive or determine a timing requirement associated with the time-sensitive data packet. At block 608, the TsSDN controller can determine a network path through the network infrastructure using one or more of only the time-sensitive network devices. The network path has a predictable latency that causes end to end delay for the time-sensitive data packet to be less than the timing requirement. In some embodiments, end to end delay for a data packet takes into account latency through each layer the data packet transitions through after it is conjured at an application layer of the first entity. For example, the time-sensitive data packet can transition through an application layer and an operating system stack at each of the first and second devices and through a control plane and a data plane of the TsSDN network associated with the TsSDN controller. In some embodiments, determining the network path can include programming the network devices in the network path so that other data packets that are a part of the same flow can be transported using the same network path. At block 610, the time-sensitive data packet is transmitted from the first device to the second device via the network path FIG. 6B is a logic flow diagram illustrating an example method of transmitting a time-aware data packet through the first device and network infrastructure in FIG. 6A. In this method, the TsSDN controller receives a data packet to be delivered from the first device to a third device across the network infrastructure at block 620. At block 622, the TsSDN controller based on network configuration information associated with the data packet (e.g., QoS) can determine that the data packet is a time-aware data packet that includes time-aware data. At block 624, the TsSDN controller determines a timing requirement for delivering the time-aware data packet. At block 626, the TsSDN controller determines a second network path through the network infrastructure using one or more network devices selected from the time-sensitive network devices and the non-time-sensitive network devices that comprise the network infrastructure. The second network path has a predictable latency that causes end to end delay for the time-aware data packet to be less than a timing requirement associated with the time-aware data packet. The time-aware data packet is then transmitted from the first device to the third device through the second network path.

Figure 6C:
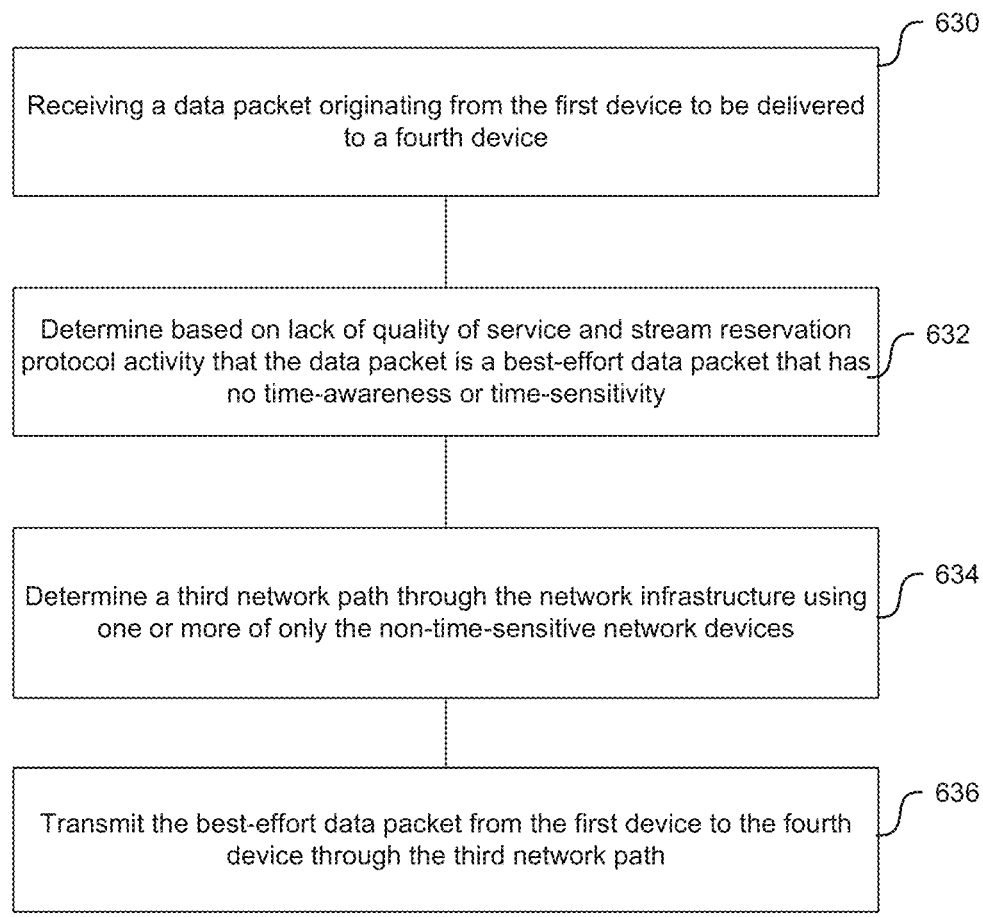

FIG. 6C is a logic flow diagram illustrating an example method of transmitting a best-effort data packet through the first device and network infrastructure in FIGS. 6A and 6B. At block 630, the TsSDN controller receives a data packet to be delivered from the first device to a fourth device across the network infrastructure. The TsSDN controller based on network configuration information associated with the data packet determines that the data packet is a best-effort data packet that has no time-sensitivity or time-awareness at block 632. At block 634, the TsSDN controller determines a third network path through the network infrastructure using one or more of only the non-time-sensitive network devices to deliver the best-effort data packet. The best-effort data packet is then transmitted from the first device through the third network path to the fourth device.

Figure 6D:
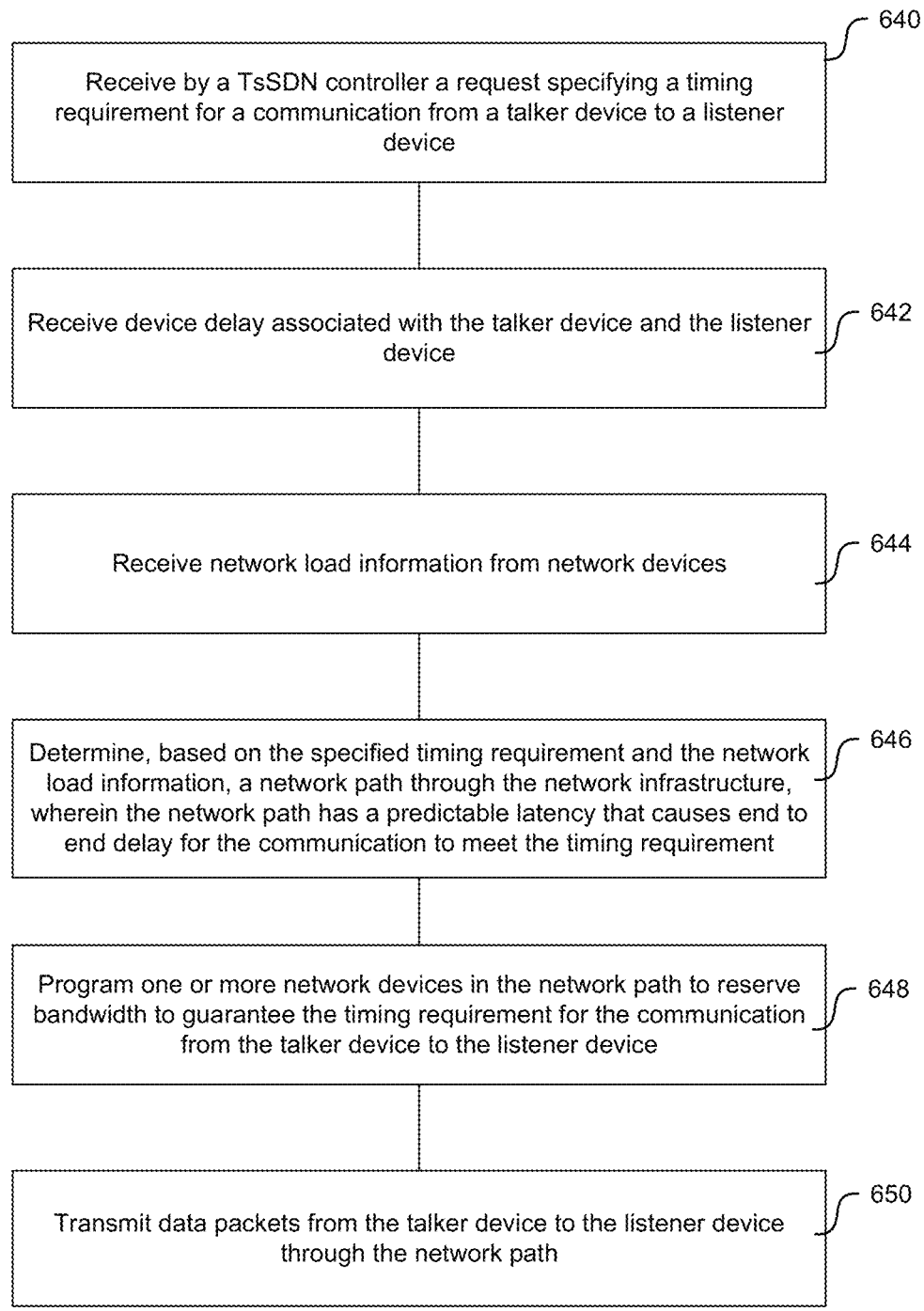
FIG. 6D is a logic flow diagram illustrating an example method of transmitting packet flows through a network path reserved to guarantee a specified timing requirement.

FIG. 6D is a logic flow diagram illustrating an example method of transmitting packet flows through a network path reserved to guarantee a specified timing requirement. In the example method, at block 640, a TsSDN controller (e.g., TsSDN controller 325A via time management module 338) can receive a request specifying a timing requirement for communication between a talker device and a listener device. The request, in some embodiments, can be in the form of a standard network packet sent by the talker device to the TsSDN controller. At block 642, the TsSDN controller can receive device delay associated with the talker device and the listener device. These device delays may be associated with the delays encountered at the device level as data packets transition from an application layer through a stack to a control plane and/or data plane. At block 644, the TsSDN controller receives network load information from network devices in the network. The network load information may be indicative of the available bandwidth of the network device to handle additional packet flows. At block 646, the TsSDN controller determines, based on the specified timing requirement and the network load information a network path that the talker device can use to communicate with the listener device. The network path has a predictable latency that causes end to end delay for the communication from the talker device to the listener device to be less than or equal to the specified timing requirement. At block 648, the TsSDN controller programs one or more network devices in the network path to reserve bandwidth to guarantee the timing requirement for the communication between the talker device and the listener device. At block 650, the TsSDN controller transmits data packets from the talker device to the listener device in a deterministic manner via the network path.

The above described method can be also be used for reverse, i.e., when the listener device wants to send data packets to the talker device with a time guarantee. It should be noted that depending on the timing requirement, the communication may be time-sensitive or time-aware. Similarly, depending on the timing requirement, the network path may include only TSN devices, only non-TSN devices or both TSN and non-TSN devices.

Thus, the role of the TsSDN controller is that of a mediator for TSN services in the infrastructure. A talker device can acquire a stream from the TsSDN controller which in turn secures a path to a listener device by configuring all devices on the path to the listener device. This enables the TsSDN controller to have a broader view of all streams, current and available, to which it can intelligently assign resources. One of the key differences between TsSDN and TSN is that TSN has a peer to peer to governance mandating that all participants understand all TSN protocols in order to guarantee the TSN level of service. In TsSDN, time management is logically centralized and it can eliminate a number of TSN protocols form TSN devices leaving them only with data plane standards. This approach has the advantage of significantly simplifying the management of time as well as the TSN devices themselves.

4. COMPUTER SYSTEMIZATION

Figure 7:
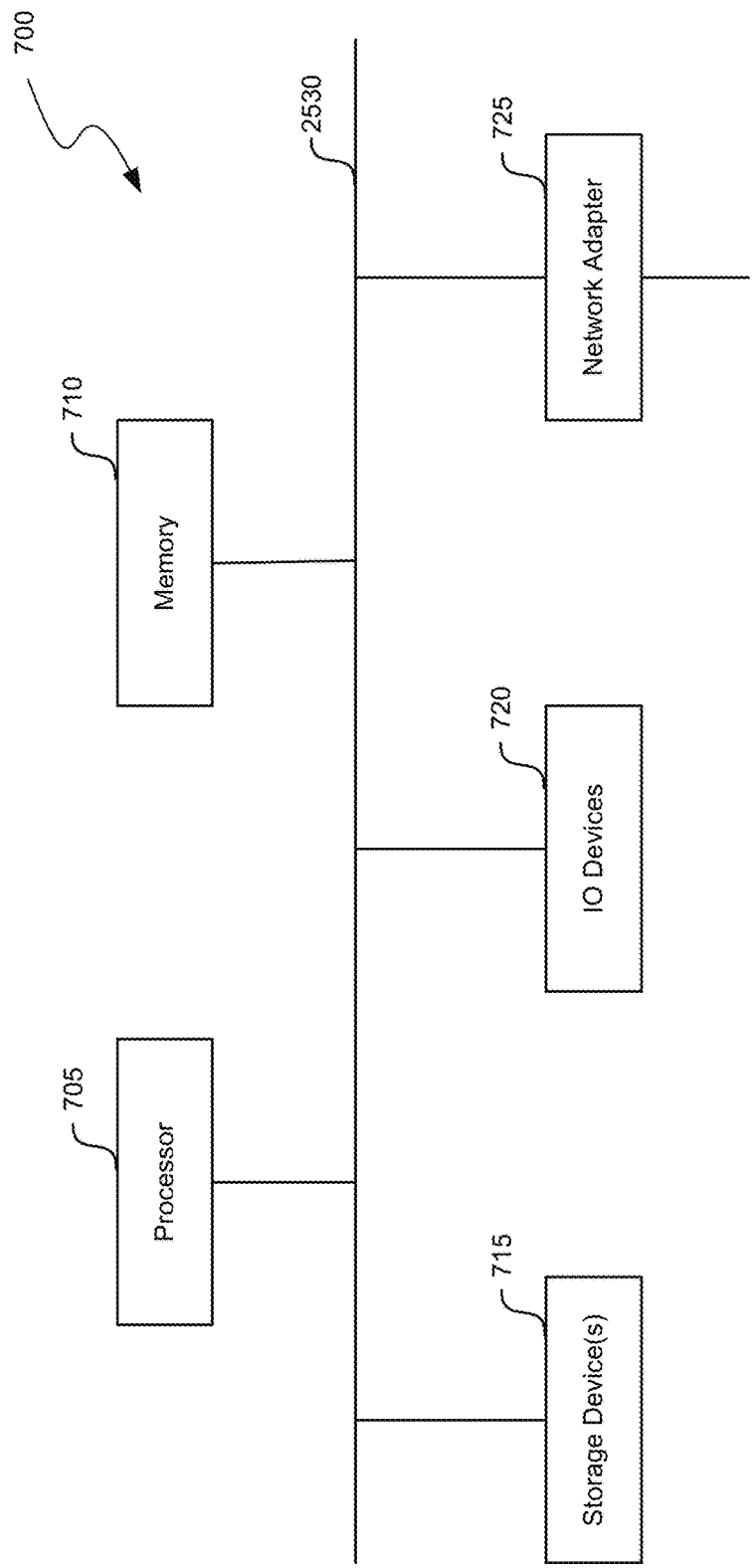
FIG. 7 shows a diagrammatic representation of a machine in the example form of a computer system within which a set of instructions, for causing the machine to perform any one or more of the methodologies discussed herein, may be executed.

FIG. 7 is a block diagram of an exemplary machine/computer/apparatus that may perform various operations, and store various information generated and/or used by such operations in accordance with some embodiments. The computer 700 is intended to illustrate a hardware device on which any of the entities, components or services depicted in the examples of FIGS. 1A-5, (and any other components described in this specification) and methodologies described in the examples of FIGS. 6A-6C can be implemented, such as a server, client devices, compute nodes, controller nodes such as the SDN controller (e.g., 120), TsSDN controller (e.g., 325, 325A, 325B, 325C, 425, 525), storage devices/nodes, databases, industrial devices (e.g., PLCs, PACs), network devices, and the like. The computer 700 includes one or more processors 705 and memory 710 coupled to an interconnect. The interconnect can represent any one or more separate physical buses, point to point connections, or both connected by appropriate bridges, adapters, or controllers.

The processor(s) 705 is/are the central processing unit(s) (CPU(s)) of the computer and, thus, control the overall operation of the computer. In certain embodiments, the processor(s) accomplish this by executing software or firmware stored in memory. The processor(s) may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 710 is or includes the main memory of the computer. The memory represents any form of random access memory (RAM), read-only memory (ROM), ternary content addressable memory (TCAM), flash memory, or the like, or a combination of such devices. In use, the memory may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) through the interconnect are a network adapter 725, a storage device(s) 715 and I/O device(s) 720. The network adapter provides the computer with the ability to communicate with remote devices, over a network and may be, for example, an Ethernet adapter or Fibre Channel adapter or wireless radio. The network adapter may also provide the computer with the ability to communicate with other computers within the cluster. In some embodiments, the computer may use more than one network adapter to deal with the communications within and outside of the cluster separately.

The I/O device(s) can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory can be implemented as software and/or firmware to program the processor(s) to carry out actions described above. In certain embodiments, such software or firmware may be initially provided to the computer by downloading it from a remote system through the computer (e.g., via network adapter). In some embodiments, memory 710 and the storage device(s) 715 can be a single entity.

The components introduced herein can be implemented by, for example, programmable circuitry (e.g., one or more microprocessors) programmed with software and/or firmware, or entirely in special-purpose hardwired (non-programmable) circuitry, or in a combination of such forms.

Special-purpose hardwired circuitry may be in the form of, for example, one or more ASICs, PLDs, FPGAs, etc.

Software or firmware for use in the SDN/TsSDN system introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A computer can also be a server computer, a client computer, a personal computer (PC), a tablet PC, a laptop computer, a set-top box (STB), a personal digital assistant (PDA), a cellular telephone, a smart phone, a tablet, a phablet, a processor, a telephone, a web appliance, a network router, switch or bridge, a controller (e.g., PLC, PAC), or any machine capable of executing a set of instructions (sequential or otherwise) that specify actions to be taken by that machine.

A machine-accessible storage medium or a storage device(s) includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

5. CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments of the disclosed system/technology have been described herein for purposes of illustration, but that various modifications may be made without deviating from the spirit and scope of the embodiments. Accordingly, the embodiments are not limited except as by the appended claims.

I claim:

1. A method of determining the shortest path from a talker device to a listener device through a time-sensitive software defined network (TsSDN), comprising:
   in a TsSDN comprising a TsSDN controller and plurality of network devices, the TsSDN having one or more paths through which traffic from a talker device can be routed to a listener device, assigning to each link between adjacent devices in the one or more paths a cost;
   determining, based on the cost of links, a first path that is the shortest path for routing traffic from the talker device to the listener device, wherein the shortest path has the lowest cost;
   detecting a change in one or more parameters associated with at least one link in the one or more paths, wherein the one or more parameters includes load;
   dynamically recalculating the cost of links in response to detecting the change; and determining from the recalculated cost of links a second path as the shortest path for routing the traffic from the talker device to the listener device;

the method further comprising determining the traffic from the talker device to be time-sensitive or non-time-sensitive, wherein the shortest path from the talker device to the listener device is through only the time-sensitive network devices when the traffic from the talker device is determined to be time-sensitive, and wherein the shortest path from the talker device to the listener device is through only the non-time-sensitive network devices when the traffic from the talker device is determined to be non-time-sensitive.

2. The method of claim 1, wherein the shortest path is determined by the TsSDN controller, and wherein the TsSDN controller uses one or more application programming interfaces (APIs) to communicate with the plurality of network devices in the TsSDN.

3. The method of claim 2, wherein the plurality of network devices include time-sensitive and non-time-sensitive network devices.

4. The method of claim 2, wherein detecting the change in the load parameter is based on information received by the TsSDN controller from the plurality of network devices.

5. The method of claim 2, wherein the TsSDN controller is a software defined network (SDN) controller having a time management module.

6. The method of claim 2, wherein the TsSDN controller is a software defined network (SDN) controller having a time-sensitive network (TSN) application.

7. The method of claim 2, wherein the TsSDN controller includes a time-sensitive multi-path routing module implementing a link state protocol that uses an equal cost multi-tree (ECMT) algorithm or Dijkstra algorithm to calculate the shortest path.

8. The method of claim 1, wherein the traffic from the talker device is determined to be time-sensitive based on stream reservation protocol activity detected in the traffic.

9. The method of claim 1, wherein the one or more parameters includes at least one of link speed or latency.

10. The method of claim 1, wherein the talker device or the listener device is a physical device, a virtual device hosted on a machine, or a service hosted on one or more distributed machines.

11. The method of claim 1, wherein each of the talker and listener devices is an industrial automation system device.

12. The method of claim 1, wherein each of the talker and listener devices is a vehicular automation system device.

13. A time-sensitive software-defined network (TsSDN) controller executing on one or more distributed hardware and configured to perform a method for determining the shortest path from a talker device to a listener device through a TsSDN, comprising:

assigning a cost to each link between adjacent devices in one or more paths in a TsSDN through which traffic from a talker device can be routed to a listener device;

determining, based on the cost of links, a first path that is the shortest path for routing traffic from the talker device to the listener device, wherein the shortest path has the lowest cost;

detecting a change in one or more parameters associated with at least one link in the one or more paths, wherein the one or more parameters includes load;

responsive to detecting the change, dynamically recalculating the cost of links; and determining from the recalculated cost of links a second path as the shortest path for routing traffic from the talker device to the listener device through the network;

wherein the plurality of network devices include time-sensitive and non-time-sensitive network devices, further comprising determining the traffic from the talker device to be time-sensitive or non-time-sensitive, wherein the shortest path from the talker device to the listener device is through only the time-sensitive network devices when the traffic from the talker device is determined to be time-sensitive, and wherein the shortest path from the talker device to the listener device is through only the non-time-sensitive network devices when the traffic from the talker device is determined to be non-time-sensitive.

14. The TsSDN controller of claim 13, wherein the TsSDN controller uses one or more application programming interfaces (APIs) to communicate with a plurality of network devices in the TsSDN.

15. The TsSDN controller of claim 13, wherein the one or more parameters includes at least one of link speed or latency.

16. The TsSDN controller of claim 13, wherein the talker device or the listener device is a physical device, a virtual device hosted on a machine, or a service hosted on one or more distributed machines.

17. The TsSDN controller of claim 13, further comprising a time management module or a time-sensitive network (TSN) application.

18. The TsSDN controller of claim 13, further comprising a time-sensitive multi-path routing module implementing a link state protocol that uses an equal cost multi-tree (ECMT) algorithm or Dijkstra algorithm to calculate the shortest path.

19. The TsSDN controller of claim 13, wherein each of the talker and listener devices is an industrial automation system device or a vehicular automation system device.

20. A non-transitory computer readable medium having stored thereon sequences of instruction which when executed by one or more machines causes the machines to perform a method for determining the shortest path from a talker device to a listener device through a time-sensitive software-defined network (TsSDN), comprising:

assigning a cost to each link between adjacent devices in one or more paths in a TsSDN through which traffic from a talker device can be routed to a listener device;

determining, based on the cost of links, a first path that is the shortest path for routing traffic from the talker device to the listener device, wherein the shortest path has the lowest cost;

detecting a change in one or more parameters associated with at least one link in the one or more paths, wherein the one or more parameters includes load;

responsive to detecting the change, dynamically recalculating the cost of links; and determining from the recalculated cost of links a second path as the shortest path for routing traffic from the talker device to the listener device through the network;

wherein the plurality of network devices include time-sensitive and non-time-sensitive network devices;

further comprising determining the traffic from the talker device to be time-sensitive or non-time-sensitive, wherein the shortest path from the talker device to the listener device is through only the time-sensitive network devices when the traffic from the talker device is determined to be time-sensitive, and wherein the shortest path from the talker device to the listener device is through only the non-time-sensitive network devices when the traffic from the talker device is determined to be non-time-sensitive.

21. The non-transitory computer readable medium of claim 20, wherein the TsSDN controller uses one or more application programming interfaces (APIs) to communicate with a plurality of network devices in the TsSDN.

22. The non-transitory computer readable medium of claim 20, wherein the one or more parameters includes at least one of link speed or latency.

23. The non-transitory computer readable medium of claim 20, further comprising a time-sensitive network (TSN) application for controlling the time-sensitive network devices.

24. The non-transitory computer readable medium of claim 20, further comprising a time-sensitive multi-path routing module implementing a link state protocol that uses an equal cost multi-tree (ECMT) algorithm or Dijkstra algorithm to calculate the shortest path.

25. The non-transitory computer readable medium of claim 20, wherein each of the talker and listener devices is an industrial automation system device or a vehicular automation system device.

* * * * *